(12) United States Patent
Seo et al.

(10) Patent No.: US 10,742,768 B2
(45) Date of Patent: Aug. 11, 2020

(54) RELAYING SYSTEM AND METHOD OF TRANSMITTING IP ADDRESS OF CLIENT TO SERVER USING ENCAPSULATION PROTOCOL

(71) Applicants: Jeong Hoan Seo, Seoul (KR); Young Suk Lim, Seoul (KR)

(72) Inventors: Jeong Hoan Seo, Seoul (KR); Young Suk Lim, Seoul (KR)

(*) Notice: Subject to any disclaimer, the term of this patent is extended or adjusted under 35 U.S.C. 154(b) by 200 days.

(21) Appl. No.: 14/896,887

(22) PCT Filed: Jun. 11, 2014

(86) PCT No.: PCT/KR2014/005130
§ 371 (c)(1),
(2) Date: Dec. 8, 2015

(87) PCT Pub. No.: WO2014/200266
PCT Pub. Date: Dec. 18, 2014

(65) Prior Publication Data
US 2016/0156742 A1    Jun. 2, 2016

(30) Foreign Application Priority Data
Jun. 12, 2013  (KR) .................. 10-2013-0067272

(51) Int. Cl.
*H04L 29/12*  (2006.01)
*H04L 29/06*  (2006.01)
(Continued)

(52) U.S. Cl.
CPC .......... *H04L 67/42* (2013.01); *H04L 12/4633* (2013.01); *H04L 61/2007* (2013.01);
(Continued)

(58) Field of Classification Search
CPC ..... H04L 67/42; H04L 67/28; H04L 61/2007; H04L 12/4633; H04L 69/22;
(Continued)

(56) References Cited

U.S. PATENT DOCUMENTS

| | | | | |
|---|---|---|---|---|
| 2002/0131403 A1* | 9/2002 | Desai | .................. | H04L 12/2801 370/352 |
| 2004/0001508 A1* | 1/2004 | Zheng | ................. | H04L 12/4633 370/466 |

(Continued)

FOREIGN PATENT DOCUMENTS

| | | |
|---|---|---|
| CN | 101399838 A | 4/2009 |
| CN | 101843075 A | 9/2010 |

(Continued)

OTHER PUBLICATIONS

International Search Report dated Sep. 17, 2014 for PCT/KR2014/005130 and English translation of the same. (4 pages).

(Continued)

*Primary Examiner* — Hitesh Patel
*Assistant Examiner* — Clifton Houston
(74) *Attorney, Agent, or Firm* — Fitch, Even, Tabin & Flannery LLP

(57) ABSTRACT

A relaying system and method of transmitting an IP address of a client to a server by using an encapsulation protocol are provided. The relaying system includes: a first proxy configured to receive an original packet including the IP address of the client in a header of the original packet attach the original packet to the inside of an encapsulation packet consisting of a header and a payload by using a predetermined encapsulation protocol, and generate a reconstructed packet; and at least one second proxy or bridge router configured to extract the original packet attached to the inside of the encapsulation packet and transmit information (Continued)

about the IP address of the client to the server. According to the relaying system and method, a host server is able to provide services using information in a packet header such as an IP address of a terminal. The presence of a proxy may be not shown to the client and the server. Tunneling communication is enabled between two terminals without any specific changes to a terminal and a host server or installation of a specific program. Furthermore, use of an encapsulation protocol is advantageous for security, and it is possible to quickly find an encapsulation packet.

7 Claims, 32 Drawing Sheets

(51) Int. Cl.
*H04L 12/46* (2006.01)
*H04L 29/08* (2006.01)
(52) U.S. Cl.
CPC .............. *H04L 67/28* (2013.01); *H04L 69/22* (2013.01); *H04L 61/6013* (2013.01)
(58) Field of Classification Search
CPC ..... H04L 61/6013; H04L 29/06; H04L 45/74; H04L 61/2528; H04L 12/6418; H04L 67/2876; H04L 49/3009; H04L 2212/00; H04W 40/22; H04W 88/04
See application file for complete search history.

(56) References Cited

U.S. PATENT DOCUMENTS

| | | | |
|---|---|---|---|
| 2008/0034201 A1* | 2/2008 | Munger | H04L 45/20 713/153 |
| 2008/0080508 A1* | 4/2008 | Das | H04L 12/4633 370/392 |
| 2008/0235358 A1 | 9/2008 | Moribe et al. | |
| 2008/0285436 A1* | 11/2008 | Robinson | H04L 12/4633 370/217 |
| 2011/0002301 A1* | 1/2011 | Chan | H04W 40/36 370/331 |
| 2011/0255473 A1* | 10/2011 | Wu | H04W 8/082 370/328 |
| 2012/0147889 A1* | 6/2012 | Lee | H04L 29/08846 370/392 |
| 2013/0034112 A1* | 2/2013 | Zhang | H04L 63/0281 370/475 |
| 2013/0058345 A1* | 3/2013 | Kano | H04L 12/4633 370/392 |
| 2013/0080575 A1* | 3/2013 | Prince | H04L 45/741 709/217 |
| 2013/0266020 A1* | 10/2013 | Li | H04L 29/06183 370/400 |
| 2014/0056300 A1* | 2/2014 | Zhao | H04L 45/42 370/392 |

FOREIGN PATENT DOCUMENTS

| | | |
|---|---|---|
| CN | 102695236 A | 9/2012 |
| JP | 2013-62753 A | 4/2013 |
| KR | 10-2003-0075810 A | 9/2003 |
| KR | 10-2005-0002541 A | 1/2005 |
| WO | 2009057004 A1 | 5/2009 |

OTHER PUBLICATIONS

Written Opinion dated Sep. 17, 2014 for PCT/KR2014/005130. (7 pages).
Choi et al; Computer Communication Security; Third Edition; Green; Jan. 16, 2006; p. 509-156.
European Search Report dated Jan. 20, 2017 for European Patent Application No. 14811211.3. (8 pages).
Perkins IBM C, "IP Encapsulation within IP; rfc2003.txt", Network Working Group RFC 1717, Internet Society (ISOC); Oct. 1, 1996.
Nikolai Qveflander, "Pushing real time data using HTML5 Web Sockets", Department of Computing Science; Aug. 11, 2011; pp. 1-76.

* cited by examiner

FIG. 16

| BYTE 1 | | BYTE 2 | BYTE 3 | BYTE 4 |
|---|---|---|---|---|
| Vers | IHL | Service Type | Packet Length ||
| Identification ||| Flag | Flag Offset |
| Time to Live || Protocol | Header Checksum ||
| Source Address |||||
| Destination Address |||||
| Options |||| Padding |

RELAYING SYSTEM AND METHOD OF TRANSMITTING IP ADDRESS OF CLIENT TO SERVER USING ENCAPSULATION PROTOCOL

CROSS-REFERENCE TO RELATED APPLICATIONS

This application is a U.S. National Phase Patent Application of International Patent Application Number PCT/KR2014/005130, filed on Jun. 11, 2014, which claims priority of Korean Patent Application Number 10-2013-0067272, filed Jun. 12, 2013, which are hereby incorporated herein by reference in their entirety.

FIELD OF THE INVENTION

The present invention relates to a relaying system between a client and a server via a communication network, and in particular, to a relaying system and method of transmitting an Internet Protocol (IP) address of a client to a server by using an encapsulation protocol, which are capable of transmitting a packet to a destination (the server) in the same form as originally transmitted by the user (the client) during wired/wireless communication through relay equipment such as a proxy or gateway.

BACKGROUND OF THE INVENTION

A server and a user's PC are points of origin and termination of data, and such an origin or termination point is referred to as an end system (ES).

A network connects ESs together, and a device present between ESs is referred to as an Intermediate System (IS). The ISs guide data to a destination to enable communication between ESs. Some examples of the ISs are a switch, a router, etc.

A proxy server refers to a computer or application program that allows a client to indirectly connect to a server on another network that provides services through the proxy server itself. The proxy server functions as a relay between a server and a client. A function of performing communication on behalf of the server or the client is referred to as a 'proxy', and a device that performs such a relay function is referred to as a 'proxy server'.

In a system using a proxy server, the proxy server functionally serves as ISs but actually as an ES. Communication between a user's PC and a proxy and communication between the proxy and a server are performed over separate networks, and the proxy only relays data. A source IP address in a packet header being delivered during communication is used as an IP address of the user's PC in the communication between the user's PC and the proxy and as an IP address of the proxy in the communication between the proxy and the server. Thus, the server suffers from the inconvenience of not being able to process a packet before providing a service using the source IP address in the packet.

SUMMARY OF THE INVENTION

To solve the inconvenience described above, an object of the present invention is to provide a relaying system (Proxy and Bridge Router) for transmitting an Internet Protocol (IP) address of a client to a server by using an encapsulation protocol, which is capable of delivering information (the IP address) of the client that has sent data by changing address information recorded in a header of a packet being exchanged between the client and a destination server in a system using a relay server such as a proxy.

Another object of the present invention is to provide a relaying method of transmitting an IP address of a client to a server by using an encapsulation protocol, which is capable of delivering information (the IP address) of the client that has sent data by changing address information recorded in a header of a packet being exchanged between the client and a destination server in a system using a relay server such as a proxy.

Another object of the present invention is to provide a relay device for use in a relaying system for transmitting an IP address of a client to a server by using an encapsulation protocol.

To achieve the object of the present invention, there is provided a relaying system for transmitting an Internet Protocol (IP) address of a client to a server by using an encapsulation protocol including: a first proxy configured to receive an original packet including the IP address of the client in a header of the original packet, attach the original packet to the inside of an encapsulation packet consisting of a header and a payload by using the predetermined encapsulation protocol, and generate a reconstructed packet; and at least one second proxy or bridge router configured to extract the original packet attached to the inside of the encapsulation packet and transmit information about the IP address of the client to the server.

According to an aspect of the present invention, the first proxy includes: a forward packet reconstruction unit configured to change a destination address of the original packet including the IP address of the client in the header to a server address, perform encapsulation by attaching the changed original packet to the inside of the encapsulation packet consisting of the header and the payload according to the predetermined encapsulation protocol, and generate the reconstructed packet by adding a new header to the encapsulation packet; and a forward route controller configured to transmit the reconstructed packet to a destination along a preset route, wherein the at least one second proxy or bridge router comprises a reconstructed packet dissection unit configured to remove a header of the reconstructed packet and transmit the changed original packet that is inside the encapsulation packet in the reconstructed packet to the destination.

According to another aspect of the present invention, the first proxy includes: a forward packet reconstruction unit configured to perform encapsulation by attaching the original packet including the IP address of the client in the header to the inside of the encapsulation packet consisting of the header and the payload according to the predetermined encapsulation protocol and generate the reconstructed packet by adding a new header to the encapsulation packet; and a forward route controller configured to transmit the reconstructed packet to a destination along a preset route, wherein the at least one second proxy or bridge router comprises a reconstructed packet dissection unit configured to remove a header of the reconstructed packet and change a destination address in the header of the original packet that is inside the encapsulation packet in the reconstructed packet to a server address.

The at least one second proxy or bridge router further includes: a reverse packet reconstruction unit configured to receive a server original packet including the IP address of the client in a header, change a source address in the header of the server original packet to an address of the first proxy, perform encapsulation by attaching the changed server original packet to the inside of an encapsulation packet consisting of a header and a payload by using the predetermined encapsulation protocol, and generate a server reconstructed packet by adding a new header to the encapsulation packet; and a reverse route controller configured to transmit the server reconstructed packet to a destination along a preset route, wherein the first proxy further comprises a reverse reconstructed packet dissection unit configured to remove a header of the server reconstructed packet and transmit the server original packet whose source address has been changed to a destination address of the server original packet.

According to an aspect of the present invention, the at least one second proxy or bridge router further includes: a reverse packet reconstruction unit configured to receive a server original packet including the IP address of the client in a header, perform encapsulation by attaching the server original packet to the inside of an encapsulation packet consisting of a header and a payload by using the predetermined encapsulation protocol, and generate a server reconstructed packet by adding a new header to the encapsulation packet; and a reverse route controller configured to transmit the server reconstructed packet to a destination along a preset route, wherein the first proxy further comprises a reverse reconstructed packet dissection unit configured to remove a header of the server reconstructed packet, change a source address in the header of the server original packet to an address of the first proxy, and transmit the changed server original packet to a destination address of the server original packet along a preset route.

To achieve the other object of the present invention, there is provided a method of transmitting an IP address of a client to a server via a relaying system by using an encapsulation protocol, the method including changing, via a first relay device, a destination address of the original packet including the IP address of the client in the header to a server address; performing, via the first relay device, encapsulation by attaching the changed original packet to the inside of an encapsulation packet consisting of a header and a payload according to the predetermined encapsulation protocol and generating a reconstructed packet by adding a new header to the encapsulation packet; transmitting, via the first relay device, the reconstructed packet to a destination along a preset route; and extracting, via a second relay device, the encapsulation packet by removing a header of the reconstructed packet and transmitting the changed original packet that is inside the encapsulation packet to a destination.

According to an aspect of the present invention, the generating of the reconstructed packet includes changing a destination address of an original packet including an IP address of a client in a header to a server address, performing encapsulation by attaching the changed original packet to a payload of an encapsulation packet consisting of a header and the payload according to the predetermined encapsulation protocol, and generating a reconstructed packet by adding a new header to the encapsulation packet.

According to another aspect of the present invention, the generating of the reconstructed packet includes changing a destination address of an original packet including an IP address of a client in a header to a server address, including information in a header of the changed original packet in a data region of the original packet, performing encapsulation by attaching information included in the data region of the original packet to a payload of an encapsulation packet consisting of a header and the payload according to the predetermined encapsulation protocol, and generating a reconstructed packet by adding a new header to the encapsulation packet.

According to another aspect of the present invention, the generating of the reconstructed packet includes changing a destination address of an original packet including an IP address of a client in a header to a server address, performing encapsulation by attaching the IP address of the client contained in a header of the changed original packet to a header of an encapsulation packet consisting of the header and a payload according to a predetermined encapsulation protocol, and generating a reconstructed packet by adding a new header to the encapsulation packet.

To achieve the other object of the present invention, there is provided a method of transmitting an IP address of a client to a server via a relaying system by using a predetermined encapsulation protocol, the method including: performing, via a first relay device, encapsulation by attaching an original packet including the IP address of the client in a header to the inside of an encapsulation packet consisting of a header and a payload according to the predetermined encapsulation protocol and generating a reconstructed packet by adding a new header to the encapsulation packet; transmitting, via the first relay device, the reconstructed packet to a destination along a preset route; and extracting, via a second relay device, the encapsulation packet by removing a header of the reconstructed packet and changing a destination address in the header of the original packet that is inside the extracted encapsulation packet to a server address According to an aspect of the present invention, the generating of the reconstructed packet includes performing encapsulation by attaching an original packet including an IP address of a client in a header to a payload of an encapsulation packet consisting of a header and the payload according to the predetermined encapsulation protocol and generating a reconstructed packet by adding a new header to the encapsulation packet According to another aspect of the present invention, the generating of the reconstructed packet includes including information in a header of an original packet including an IP address of a client in the header in a data region of the original packet, performing encapsulation by attaching information included in the data region of the original packet to a payload of an encapsulation packet consisting of a header and the payload according to a predetermined encapsulation protocol, and generating a reconstructed packet by adding a new header to the encapsulation packet.

According to another aspect of the present invention, the generating of the reconstructed packet includes performing encapsulation by attaching an IP address of a client contained in a header of an original packet to a header of an encapsulation packet consisting of the header and a payload according to the predetermined encapsulation protocol and generating a reconstructed packet by adding a new header to the encapsulation packet.

To achieve the other object of the present invention, there is provided a method of relaying a data packet to an IP address of a client by using an encapsulation protocol, the method including: receiving, via a first relay device, a server original packet including the IP address of the client in a header and changing a source address in the header of the server original packet to an address of a first proxy; performing, via the first relay device, encapsulation by attaching the changed server original packet to the inside of an encapsulation packet consisting of a header and a payload according to a predetermined encapsulation protocol and generating a server reconstructed packet by adding a new header to the encapsulation packet; transmitting, via the first relay device, the server reconstructed packet to a destination along a preset route; and extracting, via a second relay device, the encapsulation packet by removing a header of the server reconstructed packet and transmitting the server original packet that is inside the extracted encapsulation packet to a destination address of the server original packet.

To achieve the other object of the present invention, there is provided a method of relaying a data packet to an IP address of a client by using an encapsulation protocol, the method including: receiving, via a first relay device, a server original packet including the IP address of the client in a header and changing a source address in the header of the server original packet to an address of a first proxy; performing, via the first relay device, encapsulation by attaching the changed server original packet to the inside of an encapsulation packet consisting of a header and a payload according to a predetermined encapsulation protocol and generating a server reconstructed packet by adding a new header to the encapsulation packet; transmitting, via the first relay device, the server reconstructed packet to a destination along a preset route; and extracting, via a second relay device, the encapsulation packet by removing a header of the server reconstructed packet and transmitting the server original packet that is inside the extracted encapsulation packet to a destination address of the server original packet.

To achieve the other object of the present invention, there is provided a relay device for transmitting an IP address of a client to a server, the relay device including: a forward packet reconstruction unit configured to change a destination address of an original packet including an IP address of a client in a header to a server address, perform encapsulation by attaching the changed original packet to the inside of an encapsulation packet consisting of a header and a payload according to a predetermined encapsulation protocol, and generate a reconstructed packet by adding a new header to the encapsulation packet; and a forward route controller configured to transmit the reconstructed packet to a destination along a preset route.

According to an aspect of the present invention, the forward packet reconstruction unit changes a destination address of an original packet including an IP address of a client in a header to a server address, performs encapsulation by attaching the changed original packet to a payload of an encapsulation packet consisting of a header and the payload according to the predetermined encapsulation protocol, and generates a reconstructed packet by adding a new header to the encapsulation packet.

The forward packet reconstruction unit changes a destination address of an original packet including an IP address of a client in a header to a server address, includes information in a header of the changed original packet in a data region of the original packet, performs encapsulation by attaching information included in the data region of the original packet to a payload of an encapsulation packet consisting of a header and the payload according to the predetermined encapsulation protocol, and generates a reconstructed packet by adding a new header to the encapsulation packet.

According to another aspect of the present invention, the forward packet reconstruction unit changes a destination address of an original packet including an IP address of a client in a header to a server address, performs encapsulation by attaching the IP address of the client contained in a header of the changed original packet to a header of an encapsulation packet consisting of the header and a payload according to the predetermined encapsulation protocol, and generates a reconstructed packet by adding a new header to the encapsulation packet.

To achieve the other object of the present invention, there is provided a relay device for transmitting an IP address of a client to a server, the relay device including: a forward packet reconstruction unit configured to perform encapsulation by attaching an original packet including an IP address of a client in a header to the inside of an encapsulation packet consisting of a header and a payload according to a predetermined encapsulation protocol and generate a reconstructed packet by adding a new header to the encapsulation packet; and a forward route controller configured to transmit the reconstructed packet to a destination along a preset route.

According to an aspect of the present invention, the forward packet reconstruction unit performs encapsulation by attaching an original packet including an IP address of a client in a header to a payload of an encapsulation packet consisting of a header and the payload according to the predetermined encapsulation protocol and generates a reconstructed packet by adding a new header to the encapsulation packet.

The forward packet reconstruction unit includes information in a header of an original packet including an IP address of a client in the header in a data region of the original packet, performs encapsulation by attaching information included in the data region of the original packet to a payload of an encapsulation packet consisting of a header and the payload according to a predetermined encapsulation protocol, and generates a reconstructed packet by adding a new header to the encapsulation packet.

According to another aspect of the present invention, the forward packet reconstruction unit performs encapsulation by attaching an IP address of a client contained in a header of an original packet to a header of an encapsulation packet consisting of the header and a payload according to the predetermined encapsulation protocol, and generates a reconstructed packet by adding a new header to the encapsulation packet.

To achieve the other object of the present invention, there is provided a relay device for transmitting an IP address of a client to a server, the relay device including: a reverse packet reconstruction unit configured to receive a server original packet including an IP address of a client in a header, change a source address in the header of the server original packet to an address of a first proxy, perform encapsulation by attaching the changed server original packet to the inside of an encapsulation packet consisting of a header and a payload according to a predetermined encapsulation protocol, and generate a server reconstructed packet by adding a new header to the encapsulation packet; and a reverse route controller configured to transmit the server reconstructed packet to a destination along a preset route.

To achieve the other object of the present invention, there is provided a relay device for transmitting an IP address of a client to a server, the relay device including: a reverse packet reconstruction unit configured to receive a server original packet including an IP address of a client in a header, perform encapsulation by attaching the server original packet to the inside of an encapsulation packet consisting of a header and a payload by using a predetermined encapsulation protocol, and generate a server reconstructed packet by adding a new header to the encapsulation packet; and a reverse route controller configured to transmit the server reconstructed packet to a destination along a preset route.

There is also provided a processor-readable recording medium having recorded thereon a program for executing the above method on a processing device.

In a relaying system (Proxy and Bridge Router) and method of transmitting an IP address of a client to a server by using an encapsulation protocol according to the present invention, the server is able to provide services using information in a packet header such as an IP address of a terminal because an original form of a packet is exchanged between the client and the server. In other words, L3 equipment at a server side may use the information.

Furthermore, according to the present invention, a client and a server do not detect the presence of a proxy since the client and the server appear to communicate with each other without using the proxy by exchanging a packet in a client/server communication environment.

Furthermore, tunneling communication is enabled between two terminals without any specific changes to a terminal and a host server or installation of a specific program.

In addition, use of an encapsulation protocol is advantageous for security, and it is possible to quickly find an encapsulation packet.

BRIEF DESCRIPTION OF THE DRAWINGS

FIG. 16 is one example of a packet that is exchanged via a relaying system according to the present invention at Layer 3 among seven open system interconnection (OSI) layers.

DETAILED DESCRIPTION OF THE PREFERRED EMBODIMENTS

Exemplary embodiments of the present invention will now be described more fully hereinafter with reference to the accompanying drawings. Configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

According to the present invention, a client accesses to a system constructed using a proxy and information of the client is provided for a server in a communication network. In particular, the client information is provided for the server in a server communication network constructed using various relay equipment. In this case, an original packet being transmitted by the client that has accessed to the system is provided without any changes to the client and the server. The original packet is not a packet being transmitted to the proxy by the client but a packet being transmitted to the server by the client assuming the client and the server communicate directly with each other without the proxy.

Figure 1:
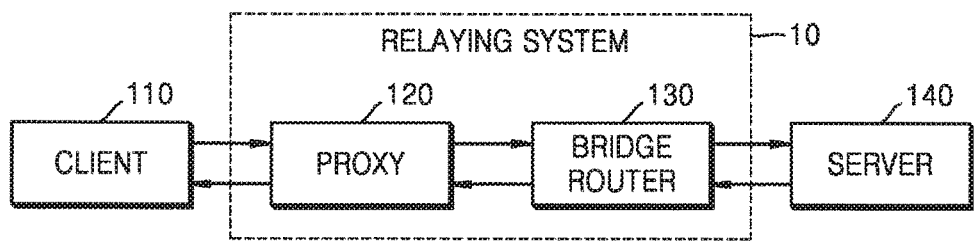
FIG. 1 is a block diagram of a configuration of a relaying system for transmitting an Internet Protocol (IP) address of a client to a server by using an encapsulation protocol according to an embodiment of the present invention.

FIG. 1 is a block diagram of a configuration of a relaying system 10 for transmitting an Internet Protocol (IP) address of a client to a server by using an encapsulation protocol according to an embodiment of the present invention. The relaying system 10 includes a proxy 120 and a bridge router 130.

For convenience of explanation, transmission of a packet generated by a client 110 to a server 140 through the proxy 120 and the bridge router 130 is hereinafter referred to as forward transmission, and transmission of a packet generated by the server 140 to the client 110 through the bridge router 130 and the proxy 120 is hereinafter referred to as reverse transmission.

Figure 2:
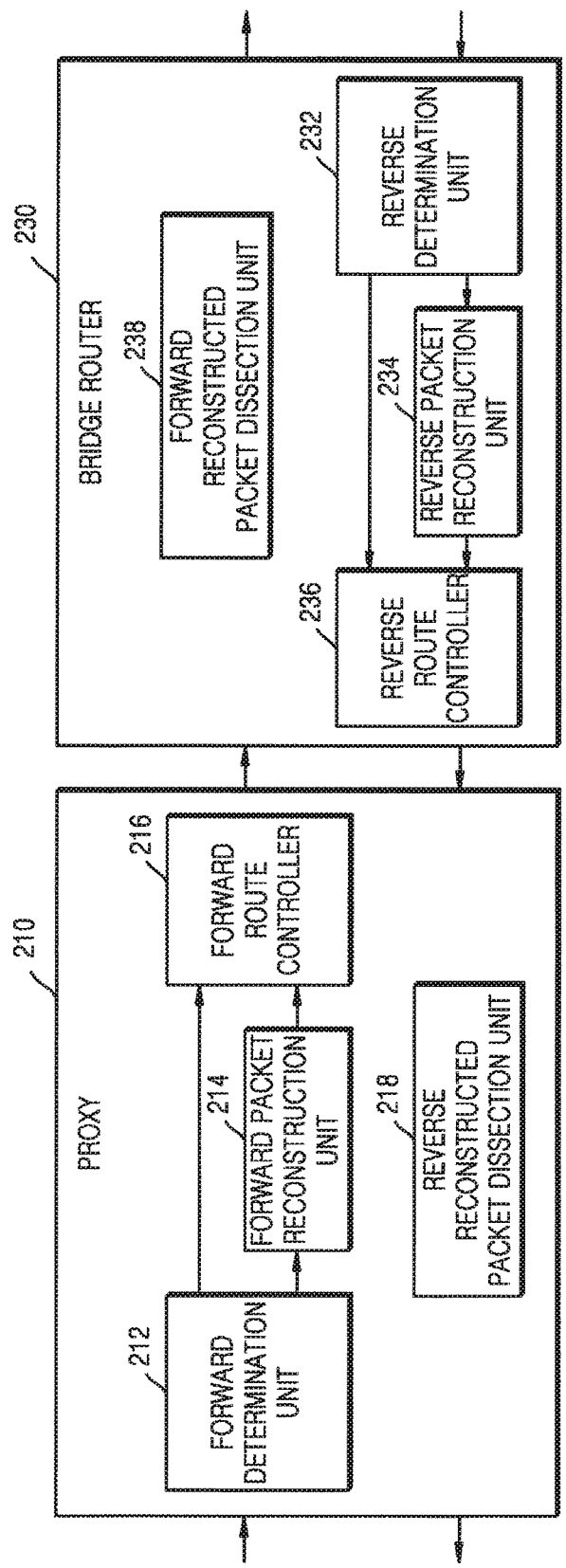
FIG. 2 is a block diagram illustrating an example of configurations of a proxy and a bridge router for forward or reverse transmission described with reference to FIG. 1.

FIG. 2 is a block diagram illustrating an example of configurations of a proxy 210 (120) and the bridge router 230 (130) for forward or reverse transmission described with reference to FIG. 1. When the proxy 210 (120) operates in forward transmission, the proxy 210 (120) includes a forward determination unit 212, a forward packet reconstruction unit 214, and a forward route controller 216. When the proxy 210 (120) operates in reverse transmission, the proxy 210 (120) includes a reverse reconstructed packet dissection unit 218.

When the bridge router 230 (130) operates in forward transmission, the bridge router 230 (130) includes a forward reconstructed packet dissection unit 238. When the bridge router 230 operates in reverse transmission, the bridge router 230 (130) includes a reverse determination unit 232, a reverse packet reconstruction unit 234, and a reverse route controller 236.

Figure 3A:
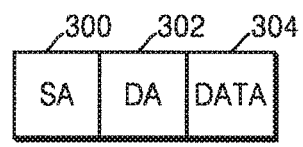
FIG. 3A is a simplified diagram of a structure of a packet used in an embodiment of the present invention.

FIG. 3A is a simplified diagram of a structure of a packet used in an embodiment of the present invention. The packet may include three regions, i.e., source address (SA) 300, destination address (DA) 302, and DATA 304. The SA 300 is a region including a source address, the DA 302 is a region including a destination address, and the DATA 304 is a region including actual data to be transmitted. The structure of the packet shown in FIG. 3A also applies to the structures of packets shown in FIGS. 3B, 3C, 4A, and 4B.

First, a configuration of the relaying system 10 for forward transmission, according to an embodiment of the present invention, will be described. For forward transmission, the relaying system 10 according to the present invention includes the proxy 120 (210) and the bridge router 130 (230). The bridge router 130 (230) may include at least one proxy and at least one bridge router.

The proxy 120 (210) receives an original packet including an IP address of the client 110 in a header and adds the original packet to the inside of an encapsulation packet consisting of a header and a payload by using an encapsulation protocol, thereby reconstructing a packet. The bridge router 130 (230) extracts the original packet attached to the inside of the encapsulation packet and transmits the IP address of the client 110 to the server 140.

Figure 3B:
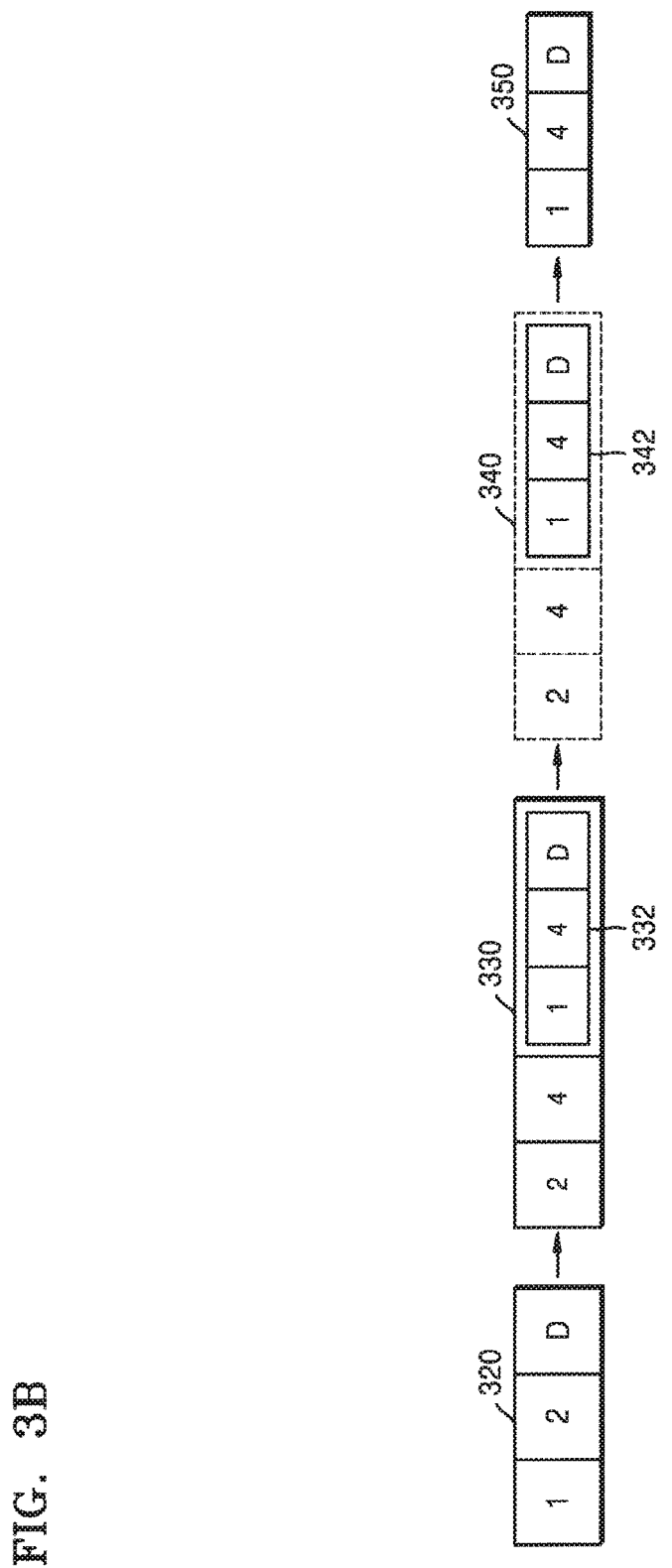
FIG. 3B illustrates a packet structure when a relaying system operates in a forward direction, according to a first embodiment of the present invention.

FIG. 3B illustrates a packet structure when the relaying system 10 operates in forward transmission, according to a first embodiment of the present invention. Numbers 1, 2, and 4 within the packet respectively denote an IP address of the client 110, an IP address of the proxy 120, and an IP address of the server 140, and D represents a data region.

The proxy 120 (210) includes the forward determination unit 212, the forward packet reconstruction unit 214, and the forward route controller 216.

The forward determination unit 212 determines whether an original packet 320 needs to be changed. If the original packet 320 needs to be changed, the forward determination unit 212 requests the change of the original packet 320. In this case, the original packet 320 includes the IP address '1' of the client 110 in an SA region of a header, the IP address '2' of the proxy 120 in a DA region of the header, and data in a DATA region.

When the forward determination unit 212 requests to change the original packet 320, the forward packet reconstruction unit 214 encapsulates the original packet 320 to generate a reconstructed packet 330. More specifically, the forward packet reconstruction unit 214 changes a destination address of the original packet 320 including the IP address 1 of the client 110 in the header to a server address. In other words, the forward packet reconstruction unit 214 changes the destination address of the original packet 320 to the IP address 4 of the server 140. Then, the forward packet reconstruction unit 214 performs encapsulation by attaching the changed original packet to the inside of an encapsulation packet consisting of a header and a payload according to a predetermined encapsulation protocol. The forward packet reconstruction unit 214 generates the reconstructed packet 330 by adding a new header to the encapsulation packet. The new header is a header of the reconstructed packet 330 and includes the IP address 2 of the proxy 120 as a source address in an SA region and the IP address 4 of the server 140 as a destination address in a DA region. Reference numeral 332 to denotes the original packet that has the changed destination address and encapsulated in the reconstructed packet 330. The new header includes the IP address 2 of the proxy 120 as a source address in the SA region and the IP address 4 of the server 140 as a destination address in the DA region.

The forward route controller 216 transmits the reconstructed packet 330 to a is destination along a preset route.

In this case, the bridge router 130 (230) includes the forward reconstructed packet dissection unit 238 that removes the header of the reconstructed packet 330 (indicated by a dashed line) and transmits the changed original packet in the encapsulation packet in the reconstructed packet 330 to the server 140 that is a destination. Reference numeral 340 denotes a packet obtained after the bridge router 130 removes the header of the reconstructed packet 330 (indicated by the dashed line). Reference numeral 350 represents a packet received by the server 140. Here, the bridge router 130 may include at least one proxy and at least one bridge router. According to the first embodiment, in the relaying system 10, the proxy 120 changes the destination address 2 of the original packet 320 and encapsulates the original packet that has the changed destination address during the forward transmission described above.

A configuration of a relaying system for forward transmission according to a second embodiment of the present invention will now be described. According to the second embodiment, during forward transmission, the bridge router 130, instead of the proxy 120, changes the destination address 2 of the original packet 320.

Figure 3C:
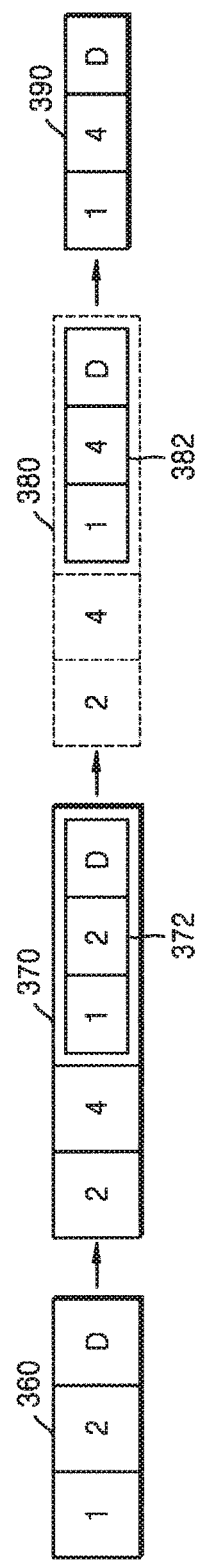
FIG. 3C illustrates a packet structure when a relaying system operates in a forward direction, according to a second embodiment of the present invention.

FIG. 3C illustrates a packet structure when the relaying system 10 operates for a forward transmission, according to a second embodiment of the present invention. Numbers 1, 2, and 4 within the packet respectively denote an IP address of the client 110, an IP address of the proxy 120, and an IP address of the server 140, and D represents a data region.

Referring to FIGS. 2 and 3C, the forward determination unit 212 determines whether an original packet 360 needs to be changed. If the original packet 360 needs to be changed, the forward determination unit 212 requests the change of the original packet 360.

When there is a request from the forward determination unit 212 to change the original packet 360, the forward packet reconstruction unit 214 reconstructs the original packet 360 to generate a reconstructed packet 370. In detail, the forward packet reconstruction unit 214 performs encapsulation by attaching the original packet 360 including the IP address 1 of the client 110 in a header to the inside of an encapsulation packet consisting of a header and a payload according to a predetermined encapsulation protocol and generates the reconstructed packet 370 by adding a new header to the encapsulation packet.

Reference numeral 372 denotes the original packet encapsulated in the reconstructed packet 370. The new header includes the IP address 2 of the proxy 120 as a source address in an SA region and the IP address 4 of the server 140 as a destination address in a DA region.

The forward route controller 216 transmits the reconstructed packet 370 to a destination along a preset route.

The bridge router 130 (230) includes the forward reconstructed packet dissection unit 238 that removes the header of the reconstructed packet 370 and changes a destination address in a header of the original packet 360 in a DA region to a server address. In other words, the IP address 2 of the proxy 120 in the DA region of the original packet 360 is changed to the IP address 4 of the server 140. As seen in reference numeral 382, the destination address 2 of the original packet 360 is changed to the IP address 4 of the server 140. Here, the bridge router 130 (230) may include at least one proxy and a bridge router.

Next, a configuration of the relaying system 10 for reverse transmission according to an embodiment of the present invention will be described.

Figure 4A:
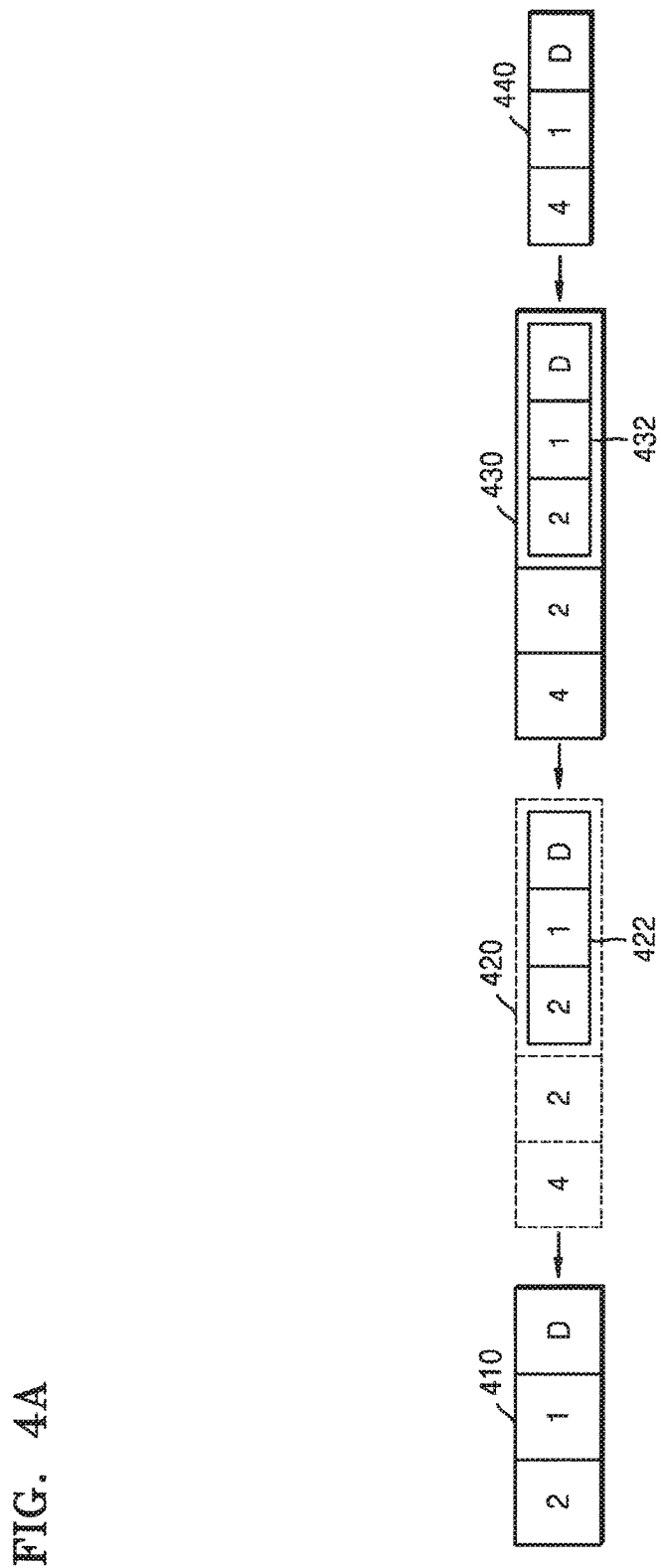
FIG. 4A illustrates a packet structure when a relaying system operates in a reverse direction, according to a first embodiment of the present invention.

FIG. 4A illustrates a packet structure when the relaying system 10 operates in reverse transmission, according to a first embodiment of the present invention. Numbers 1, 2, and 4 within the packet respectively denote an IP address of the client 110, an IP address of the proxy 120, and an IP address of the server 140, and D represents a data region.

For reverse transmission, the relaying system 10 according to the first embodiment of the present invention includes the bridge router 130 (230) and the proxy 120 (210), and the bridge router 130 (230) may include at least one proxy and a bridge router.

As shown in FIG. 2, the bridge router 130 (230) includes the reverse packet reconstruction unit 234 and the reverse route controller 236. The bridge router 130 (230) may further include the reverse determination unit 232.

A configuration of the relaying system 10 for reverse transmission according to the to first embodiment of the present invention will now be described with reference to FIGS. 2 and 4A.

The reverse determination unit 232 receives a server original packet 440 and determines whether the server original packet 440 needs to be changed. If the server original packet 440 needs to be changed, the reverse determination unit 232 requests the change of the server original packet 440. The server original packet 440 includes an IP address of the client 110 in a header. The server original packet 440 includes an IP address 4 of the server 140 in an SA region of the header, an IP address 1 of the client 110 in a DA region of the header, and data D to be transmitted from the server 140 to the client 110 in a data region.

When there is a request from the reverse determination unit 232 to change the server original packet 440, the reverse packet reconstruction unit 234 receives the server original packet 440 including the IP address 1 of the client 110 in the header and changes a source address in the header of the server original packet 440 to an address of the proxy 120 (210). The reverse packet reconstruction unit 234 then performs encapsulation by attaching the changed server original packet to the inside of an encapsulation packet consisting of a header and a payload by using a predetermined encapsulation protocol and generates a server reconstructed packet 430 by adding a new header to the encapsulation packet.

Referring to FIG. 4A, the server original packet 440 includes the IP address 4 of the server 140 in the SA region and the IP address 1 of the client 110 in the DA region. The reverse packet reconstruction unit 234 encapsulates the server original packet 440 and adds a new header to an encapsulated server original packet 432, thereby generating a server reconstructed packet 430. The new header includes the IP address 4 of the server 140 in the SA region and the IP address 2 of the proxy 120 in the DA region.

The reverse route controller 236 transmits the server reconstructed packet 430 to a destination along a preset route.

The proxy 120 (210) further includes the reverse reconstructed packet dissection unit 218 that removes the header of the server reconstructed packet 430 and transmits a changed server original packet 422 to the client 110 by using the IP address 1 of the client 110 included in the DA region of the header of the changed server original packet 422.

A configuration of the relaying system 10 for reverse transmission according to a second embodiment of the present invention will now be described.

Figure 4B:
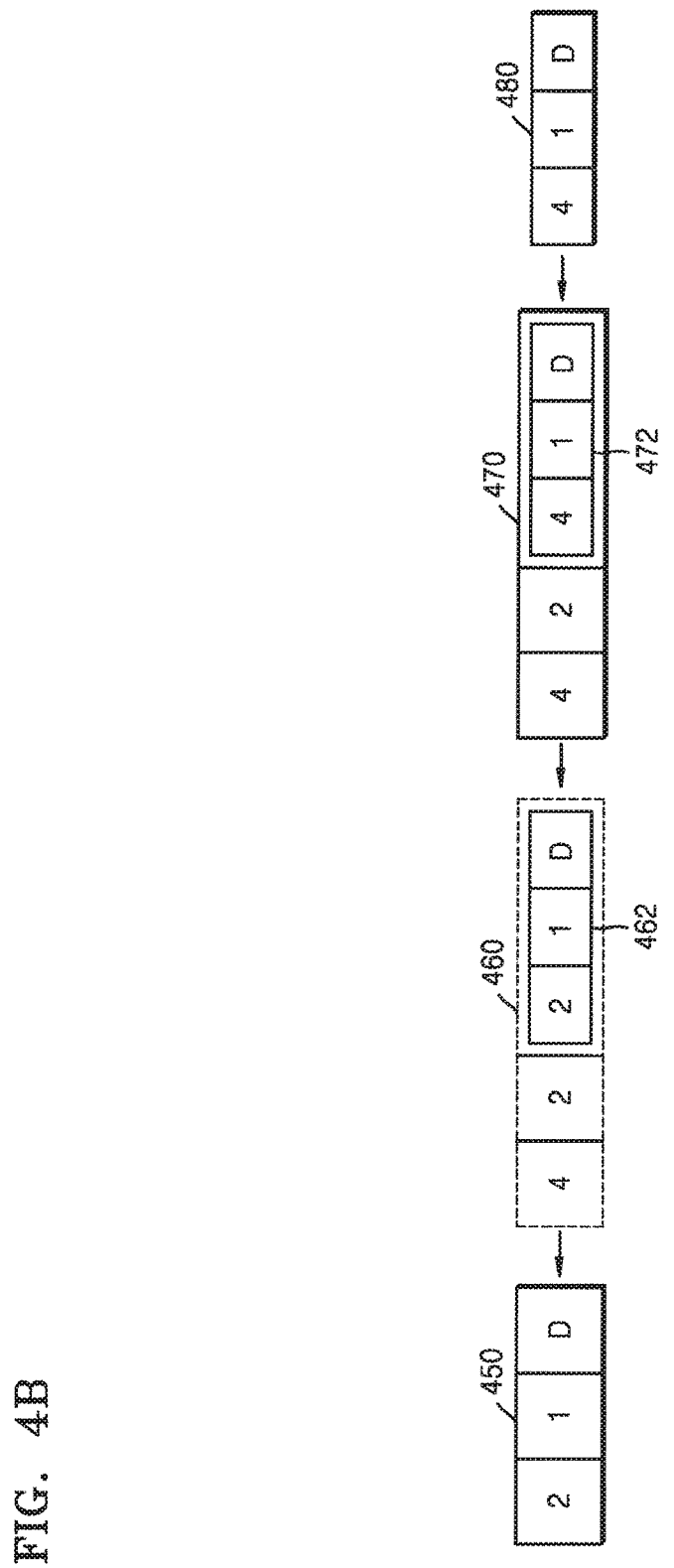
FIG. 4B illustrates a packet structure when a relaying system operates in a reverse direction, according to a second embodiment of the present invention.

FIG. 4B illustrates a packet structure when the relaying system 10 operates in a reverse direction, according to a second embodiment of the present invention. Numbers 1 through 4 within the packet respectively denote an IP address of the client 110, an IP address of the proxy 120, an IP address of the bridge router 130, and an IP address of the server 140, and D represents a data region.

For reverse transmission, the relaying system 10 according to the second embodiment of the present invention includes the bridge router 130 (230) and the proxy 120 (210), and the bridge router 130 (230) may include at least one proxy and a bridge router.

As shown in FIG. 2, the bridge router 130 (230) includes the reverse packet reconstruction unit 234 and the reverse route controller 236. The bridge router 130 (230) may further include the reverse determination unit 232.

A configuration of the relaying system 10 for reverse transmission according to the second embodiment of the present invention will now be described with reference to FIGS. 2 and 4B.

The reverse determination unit 232 receives a server original packet 480 and determines whether the server original packet 480 needs to be changed. If the server original packet 480 needs to be changed, the reverse determination unit 232 requests the change of the server original packet 480. The server original packet 480 includes an IP address 1 of the client 110 in a header. The server original packet 480 includes an IP address 4 of the server 140 in an SA region of the header, an IP address 1 of the client 110 in a DA region of the header, and data D to be transmitted from the server 140 to the client 110 in a data region.

When there is a request from the reverse determination unit 232 to change the server original packet 480, the reverse packet reconstruction unit 234
receives the server original packet 480 including the IP address 1 of the client 110 in the header, performs encapsulation by attaching the server original packet 480 to the inside of an encapsulation packet consisting of a header and a payload by using a predetermined encapsulation protocol, and generates a server reconstructed packet 470 by adding a new header to the encapsulation packet. The new header includes the IP address 4 of the server 140 in the SA region and an IP address 2 of the proxy 120 in the DA region.

The reverse route controller 236 of the bridge router 130 (230) transmits the server reconstructed packet 470 to a destination along a preset route.

The proxy 120 (210) further includes the reverse reconstructed packet dissection unit 218. The reverse reconstructed packet dissection unit 218 removes the header of the server reconstructed packet 470, changes a source address in a header of a server original packet 472 from the IP address 4 of the server 140 to the IP address 2 of the proxy 120 (210), and transmits a changed server original packet 462 to the client 110 by is using the IP address 1 of the client 110 that is a destination address of the changed server original packet 462.

Figure 5:
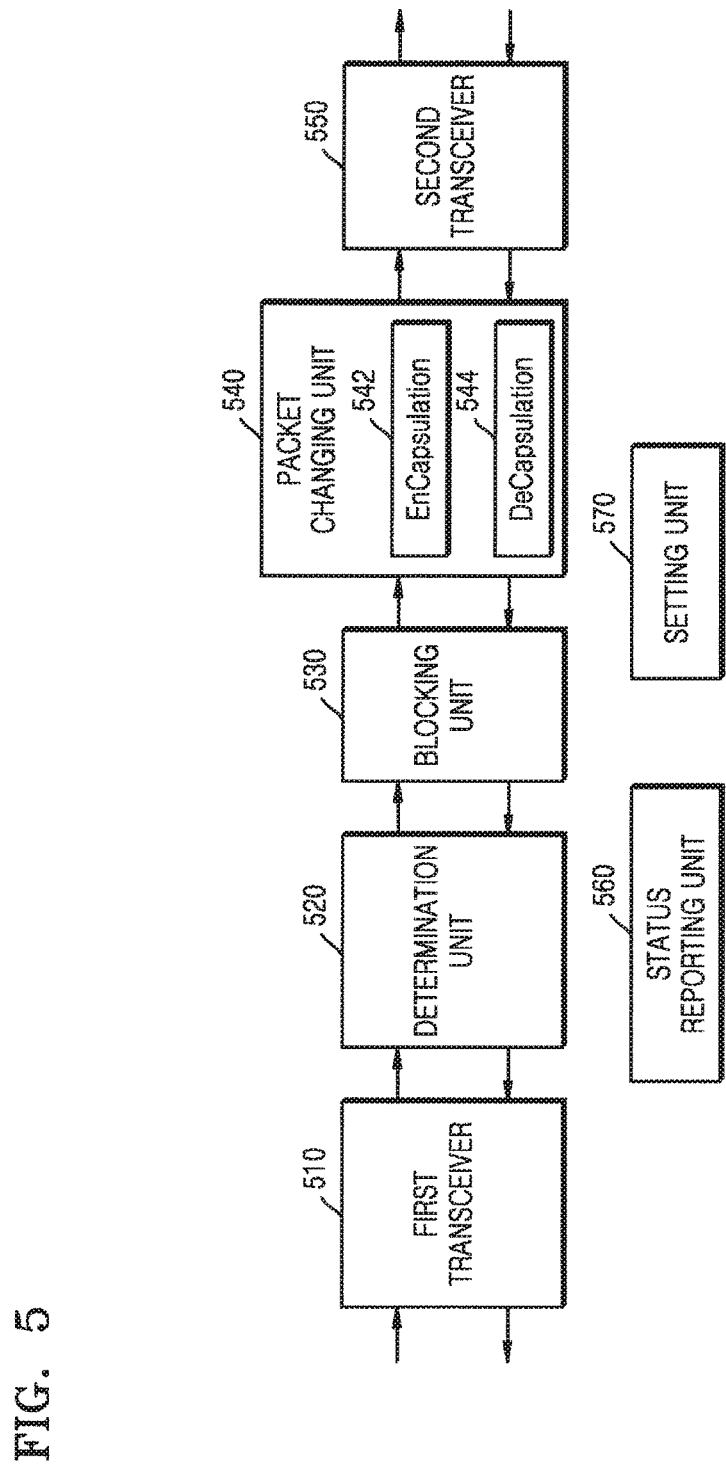
FIG. 5 is a block diagram of a proxy in a relaying system according to an embodiment of the present invention.

FIG. 5 is a block diagram of a proxy in a relaying system according to an embodiment of the present invention. The proxy includes a first transceiver 510, a determination unit 520, a blocking unit 530, a packet changing unit 540, a second transceiver 550, a status reporting unit 560, and a setting unit 570.

The first transceiver 510 creates a session and relays a packet to a set destination. The determination unit 520 determines whether to modulate/demodulate and encapsulate/decapsulate an input packet at a front or rear stage. The blocking unit 530 determines whether to normally process or block an abnormal packet. The packet changing unit 540 is a module for changing a transmission packet and performs encapsulation or decapsulation on the transmission packet as described in detail below.

The status reporting unit 560 is a module for reporting a status of an apparatus or the occurrence of a failure in the apparatus. The setting unit 570 is a module for storing information including a processing policy that is applied to an incoming or outgoing packet. Here, the blocking unit 530 may be excluded according to a configuration environment of the relaying system.

Figure 6:
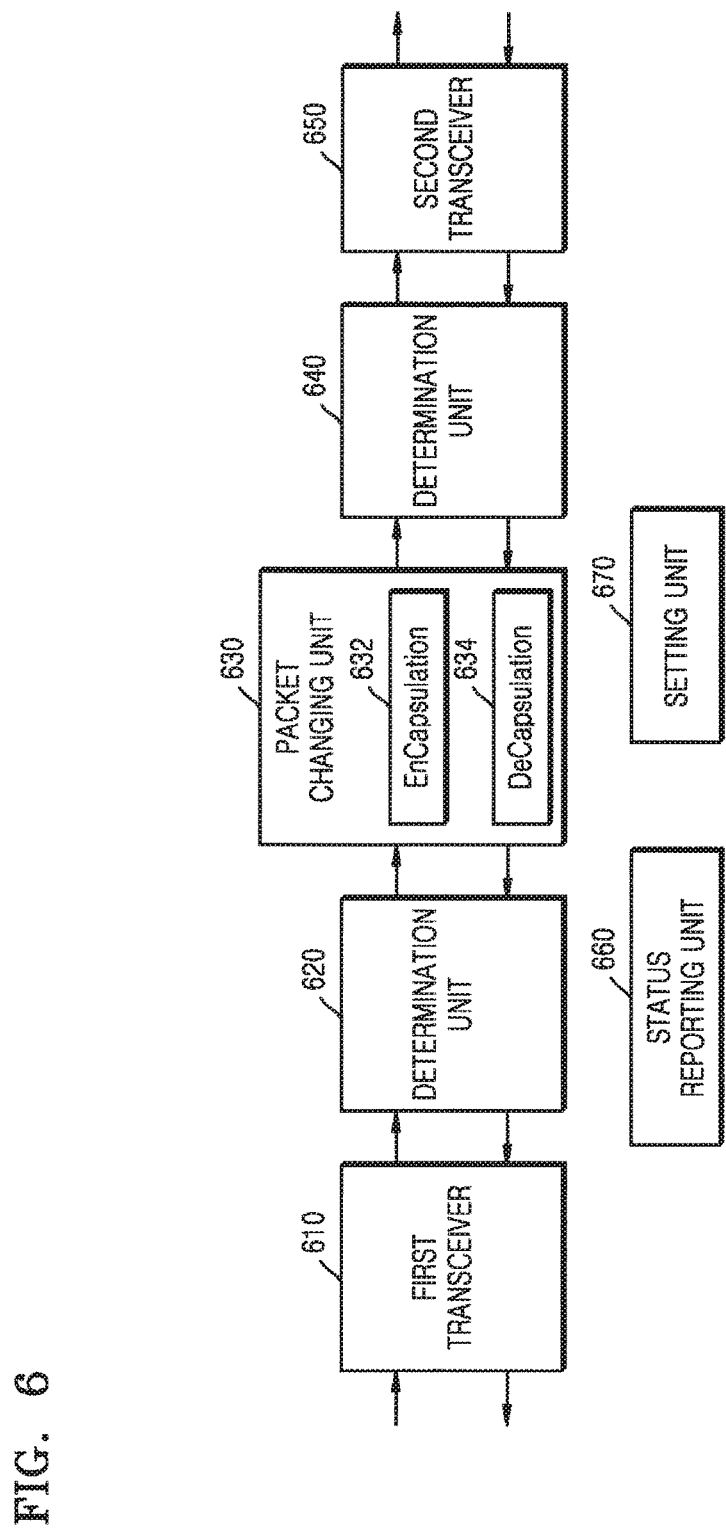
FIG. 6 is a block diagram of a bridge router in a relaying system according to an embodiment of the present invention.

FIG. 6 is a block diagram of a bridge router that constitutes a relaying system, according to an embodiment of the present invention. The bridge router includes a first transceiver 610, a determination unit 620, a packet changing unit 630, a determination unit 640, a second transceiver 650, a status reporting unit 660, and a setting unit 670.

The first transceiver 610 creates a session and relays a packet to a set destination. The determination units 620 and 640 determine whether to modulate/demodulate and encapsulate/decapsulate an input packet at a front or rear stage. The packet changing unit 630 is a module for changing a transmission packet and performs encapsulation or decapsulation on the transmission packet as described in detail below.

The status reporting unit 660 is a module for reporting a status of an apparatus or the occurrence of a failure in the apparatus. The setting unit 670 is a module for storing information including a processing policy that is applied to an incoming or outgoing packet.

FIGS. 7A through 7E illustrate configurations of relaying systems according to various embodiments of the present invention. At least two relay devices or proxy software are required to configure a relaying system. A relay device may be integrated into a client or server or be separate from the client or server on the same or a different network, according to various network environments.

Figure 7A:
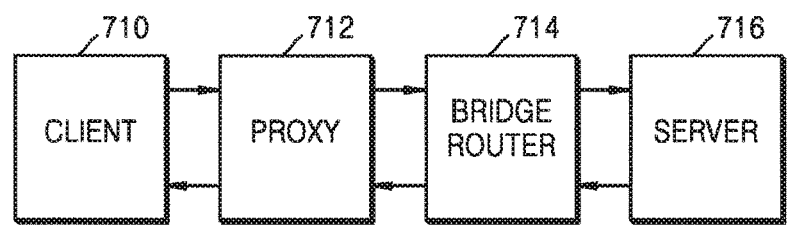
FIGS. 7A through 7E illustrate configurations of relaying systems according to various embodiments of the present invention.
Figure 7B:
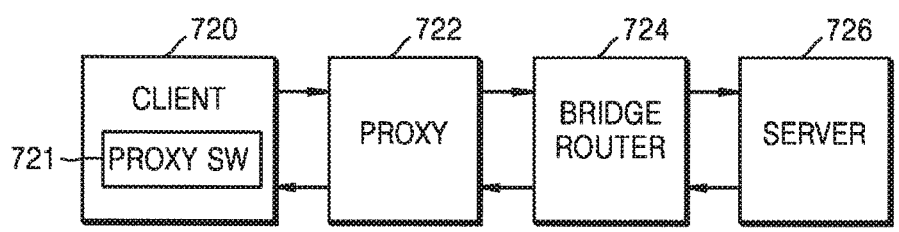
Figure 7C:
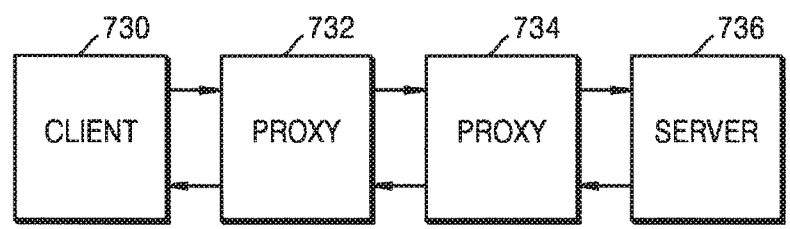
Figure 7D:
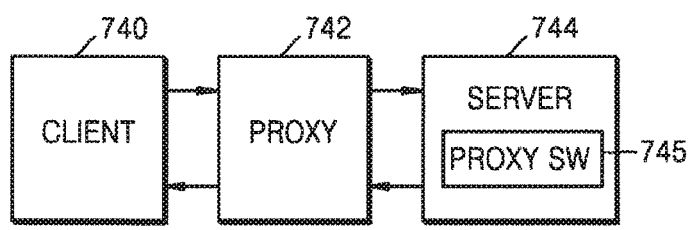
Figure 7E:
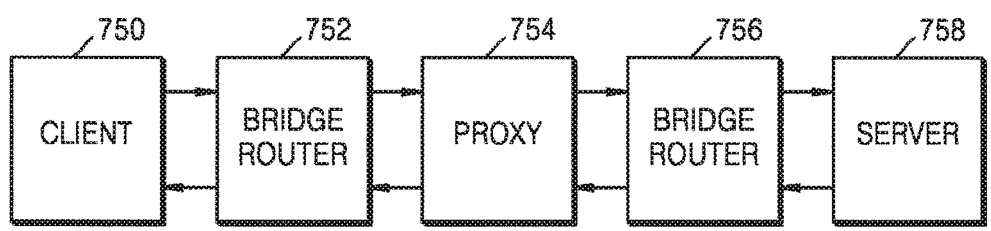

Referring to FIG. 7A, a relaying system for transmitting and receiving a packet between a client 710 and a server 716 comprises a proxy 712 and a bridge router 714. Referring to FIG. 7B, a relaying system for exchanging a packet between a client 720 and a server 726 includes proxy software 721 installed on the client 720, a proxy 722, and a bridge router 724. Referring to FIG. 7C, a relaying system for exchanging a packet between a client 730 and a server 736 includes proxies 732 and 734. Referring to FIG. 7D, a relaying system for exchanging a packet between a client 740 and a server 744 includes a proxy 742 and proxy software 745 installed on the server 744. The proxy software 745 may replace a function of the bridge router 714 shown in FIG. 7A. Referring to FIG. 7E, a relaying system for exchanging a packet between a client 750 and a server 758 includes a bridge router 752, a proxy 754, and a bridge router 756.

Figure 8:
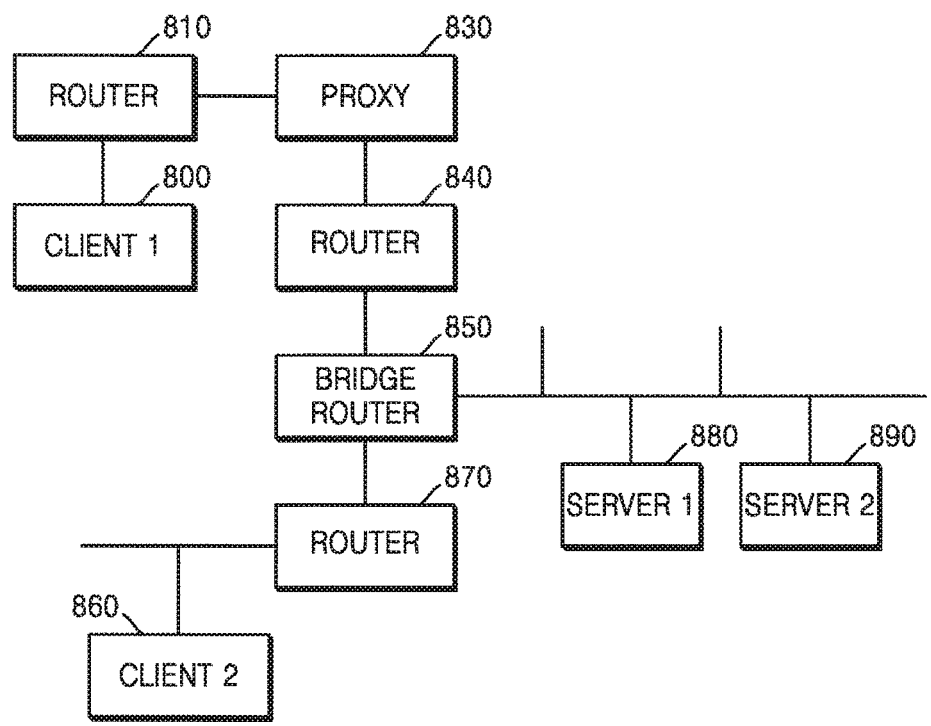
FIG. 8 illustrates a network configuration in which a client 1 transmits a packet to a server 1 or a server 2 through a relaying system according to the present invention.

FIG. 8 illustrates a network configuration in which a client 1 800 transmits a packet to a server 1 880 or server 2 890 through a relaying system including a proxy 830, a router 840, and a bridge router 850 according to the present invention. When the client 1 800 makes a query to the server 1 880 via the proxy 830, the proxy 830 modifies a destination IP address of a packet sent by the client 1 800, adds the modified packet to a data region, and sends the packet to the router 840. The bridge router 850 checks modification of the packet, determines information of the client 1 800 using the proxy 830 and whether the proxy 830 has been used, sends the packet to the server 1 880, and relays a response of the server 1 880 to the proxy 830.

FIG. 8 also shows an example where a client 2 860 requests and receives services from the server 1 880 or the server 2 890 without using the relaying system according to the present invention. When the client 2 860 makes a query directly to the server 2 890 without using the proxy 830, the bridge router 850 may make the packet bypass the proxy 830 and send the packet directly to the server 2 890 without modifying the packet. If a destination of a packet transmitted by the client 1 800 or client 2 860 is not the server 1 880 or the server 2 890, the bridge router 850 may make the packet to bypass the server 1 880 or the server 2 890.

Figure 9:
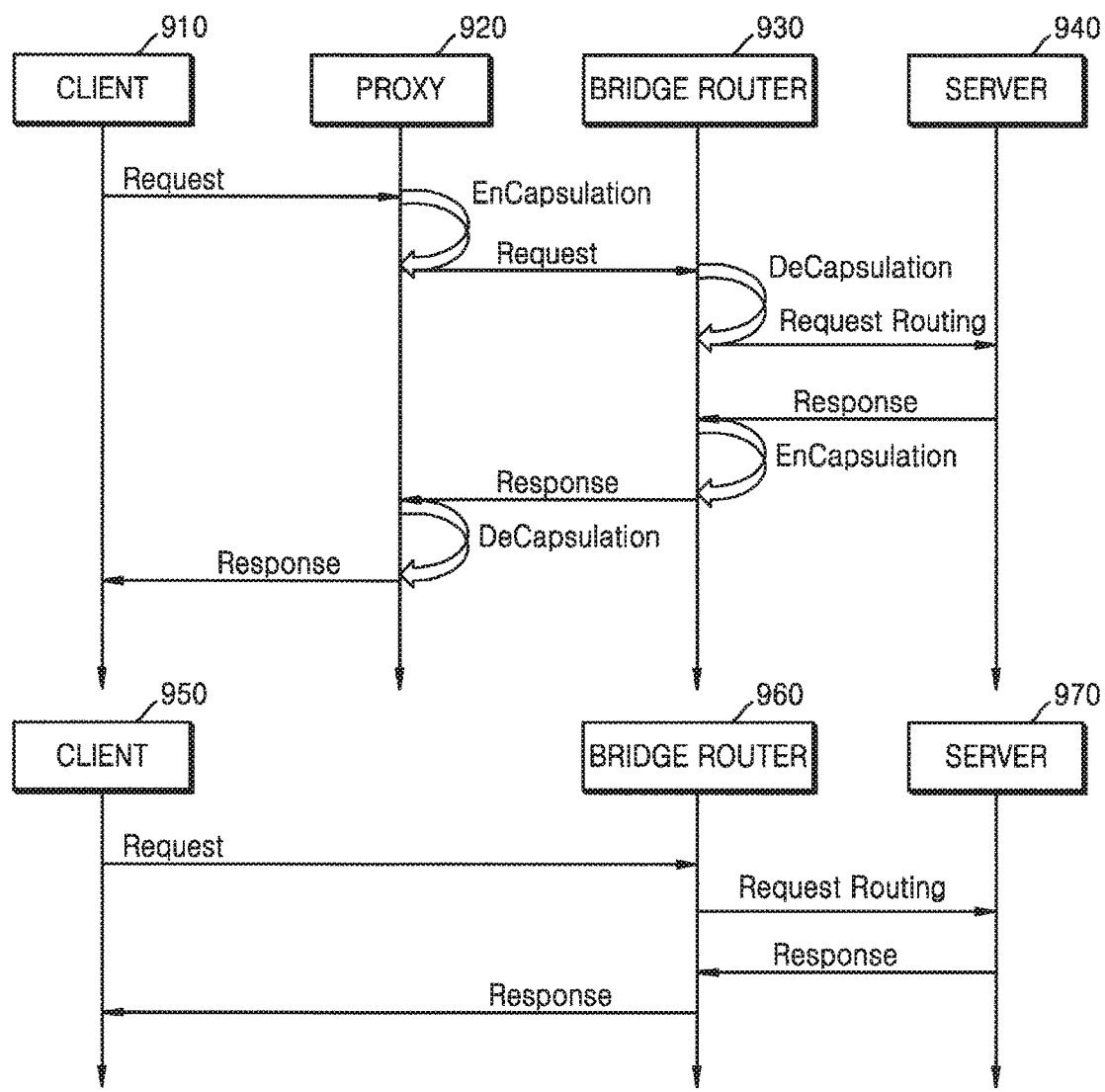
FIG. 9 illustrates all operations of a relaying system according to the present invention.

FIG. 9 illustrates all operations of a relaying system according to the present invention. A relaying system between a client 910 and a server 940 according to the present invention may include a proxy 920 and a bridge router 930. When the client 910 makes a query to the server 940, the proxy 920 modifies a destination IP address of a is packet sent by the client 910, adds the modified packet to a data region (encapsulation), and sends the packet to the bridge router 930. The bridge router 930 has previously determined that the packet has been modified and determines information of the client 910 using the proxy 920 and whether the proxy 920 has been used. Then, the bridge router 930 removes a header added to the packet that passes through the proxy 920 (Decapsulation), sends the packet to the server 940, and relays a response of the server 940 to the proxy 920.

When a client 950 requests and receives a service from a server 970 without using a relaying system between the client 950 and the server 970 according to the present invention, a packet is transmitted or received to or from a bridge router 960, instead of the proxy 920, without modifying the packet.

Figure 10:
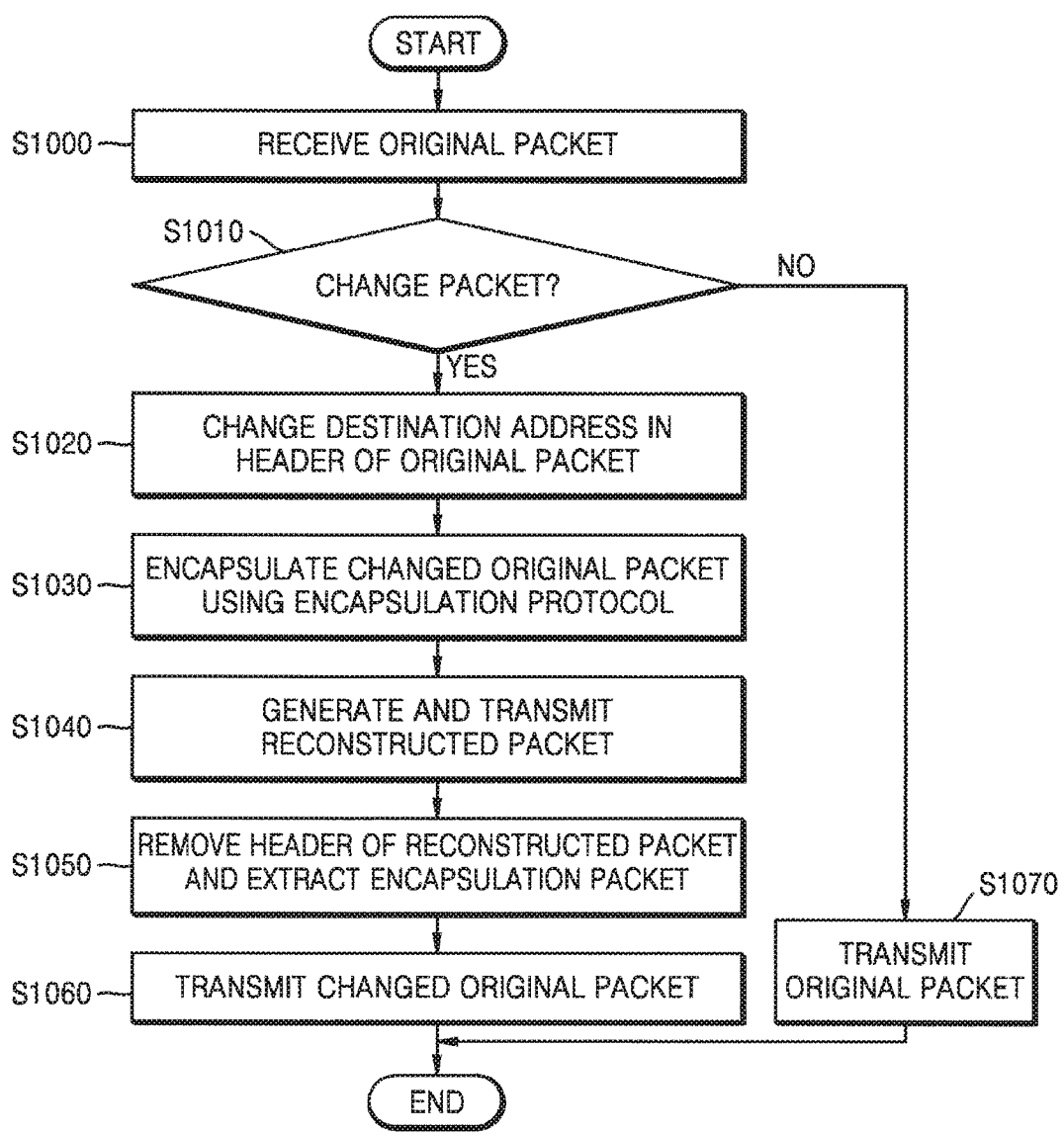
FIG. 10 is a flowchart of a relaying method of transmitting an IP address of a client to a server by using an encapsulation protocol during forward transmission, according to an embodiment of the present invention.

FIG. 10 is a flowchart of a relaying method of transmitting an IP address of a client to a server by using an encapsulation protocol during forward transmission, according to an embodiment of the present invention.

First, a first relay device receives an original packet including an IP address of a client in a header via a packet transceiver (S1000), and determines whether the original packet needs to be changed via a forward determination unit and requests, if the change of the original packet (S1010).

The first relay device changes, if there is a request for the change of the original packet, a destination address in a header of the original packet to a server address via a forward packet reconstruction unit 214 (S1020), and performs encapsulation by attaching the changed original packet to the inside of an encapsulation packet consisting of a header and a payload according to a predetermined encapsulation protocol (S1030).

The first relay device generates a reconstructed packet by adding a new header to the encapsulation packet and transmits the reconstructed packet to a destination along a preset route via a forward route controller (S1040).

A second relay device removes a header of the reconstructed packet and extracts the encapsulation packet via a forward reconstructed packet dissection unit (S1050) to and transmits the changed original packet that is inside the encapsulation packet to a destination (S1060). Otherwise, if it is determined that the original packet does not need to be changed (S1010), the second relay device transmits the original packet without modification thereto along the preset route (S1070).

Figure 11:
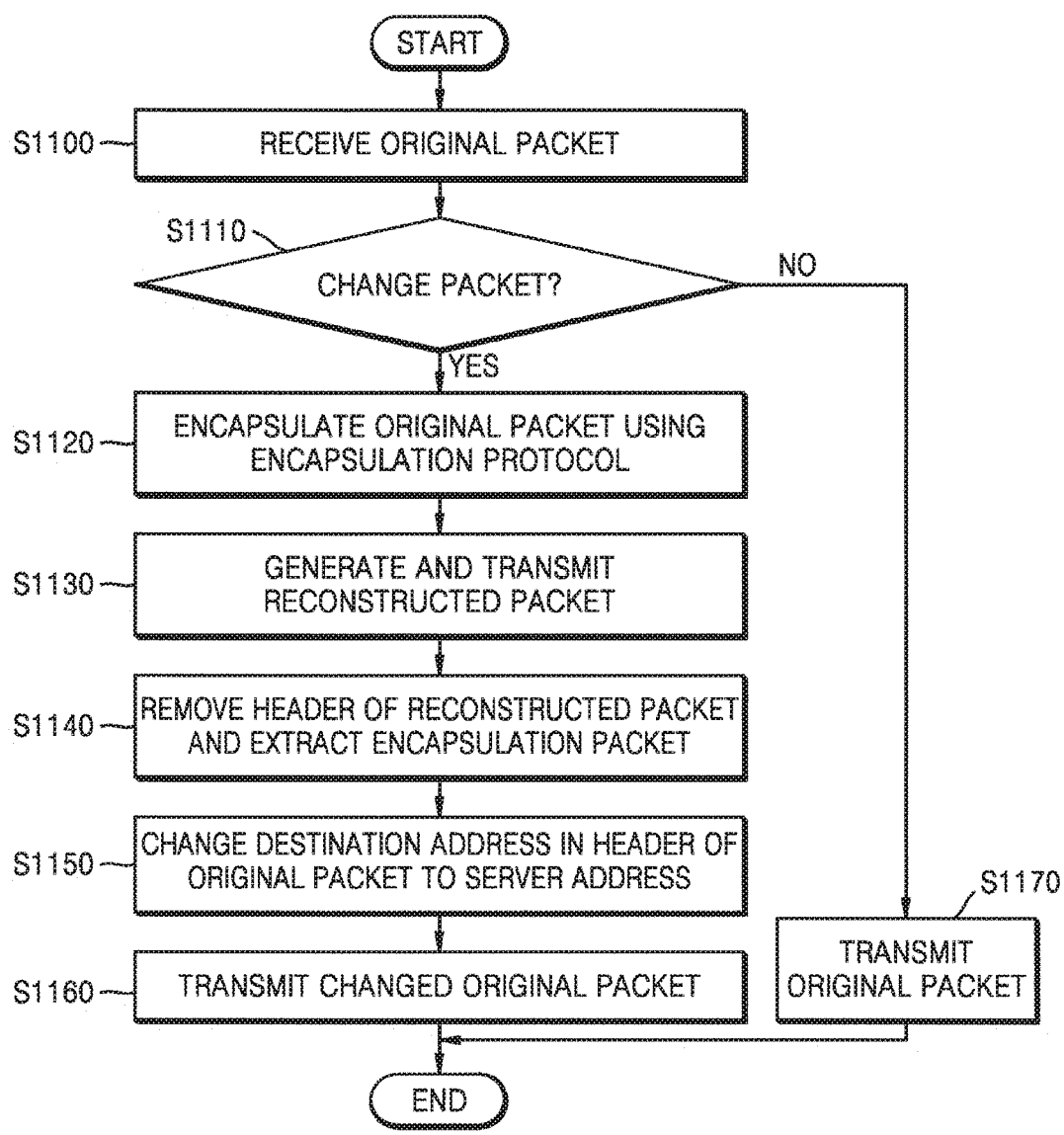
FIG. 11 is a flowchart of a relaying method of transmitting an IP address of a client to a server by using an encapsulation protocol during forward transmission, according to another embodiment of the present invention.

FIG. 11 is a flowchart of a relaying method of transmitting an IP address of a client is to a server during forward transmission, according to another embodiment of the present invention.

First, the first relay device receives an original packet including an IP address of a client in a header via the packet transceiver (S1100), and determines whether the original packet needs to be changed via the forward determination unit and requests, if the change of the original packet (S1110)

When there is a request for the change of the original packet, the first relay device performs encapsulation via the forward packet reconstruction unit by attaching the original packet including the IP address of the client in the header to the inside of an encapsulation packet consisting of a header and a payload by using a predetermined encapsulation protocol (S1120), and generates a reconstructed packet by adding a new header to the encapsulation packet and transmits the reconstructed packet to a destination along a preset route via a forward route controller (S1130).

Thereafter, the second relay device receives the reconstructed packet to remove a header of the reconstructed packet and extract the encapsulation packet via a forward reconstructed packet dissection unit (S1140), and changes a destination address in the header of the original packet that is inside the extracted encapsulation packet to a server address (S1150). The second relay device then transmits the changed original packet present in the data region of the reconstructed packet to a destination (S1160). If it is determined that the original packet does not need to be changed (S1110), the second relay device transmits the original packet without modification thereto along a preset route (S1170).

When the original packet is encapsulated using the encapsulation protocol according to the method of FIG. 10, steps S1020 through S1040 shown in FIG. 10 may be performed in the following manner.

Figure 18:
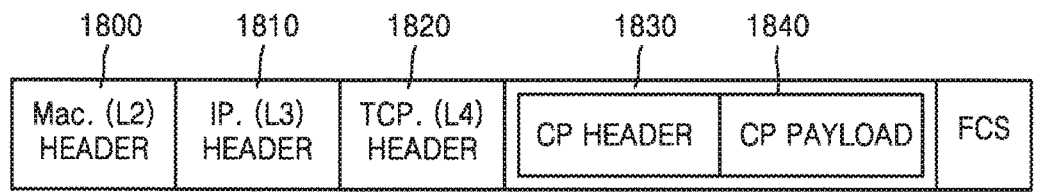
FIG. 18 shows a structure of a packet in which necessary information is added to a data region from an upper layer to a TCP layer.
Figure 19:
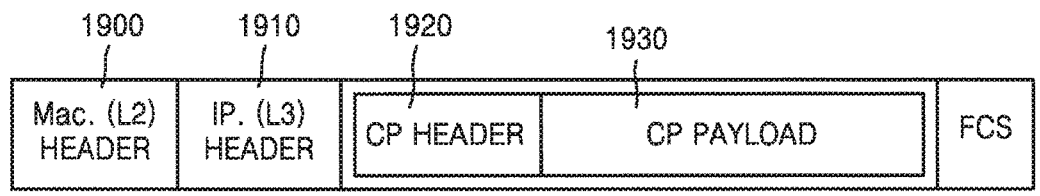
FIG. 19 illustrates a packet in which necessary information is added to an upper layer to an IP layer by using an encapsulation protocol.

According to a first embodiment, forward packet reconstruction is performed, as shown in FIGS. 18 and 19 illustrating a structure of a packet, by changing a destination address of an original packet including an IP address of a client in a header to a server address, performing encapsulation by attaching the changed original packet to the to inside of an encapsulation packet (1830 and 1840 of FIG. 18 or 1920 and 1930 of FIG. 19) consisting of a header and a payload according to a predetermined encapsulation protocol, and generating a reconstructed packet by adding a new header to the encapsulation packet.

When the original packet is encapsulated using the encapsulation protocol is according to the method of FIG. 11, steps S1120 and S1130 shown in FIG. 11 may be performed in the following manner. According to a second embodiment, as shown in FIGS. 18 and 19 illustrating a structure of a packet, the forward packet reconstruction unit 214 performs encapsulation by attaching an original packet including an IP address of a client in a header to the inside of the encapsulation packet (1830 and 1840 of FIG. 18 or 1920 and 1930 of FIG. 19) consisting of a header and a payload according to a predetermined encapsulation protocol without modifying a destination address of the original packet, and generates a reconstructed packet by adding a new header to the encapsulation packet.

In more detail, in the forward packet reconstruction illustrated in FIGS. 10 and 11, client information carried in the changed original packet may be attached to a payload or header of the encapsulation packet.

Figure 21:
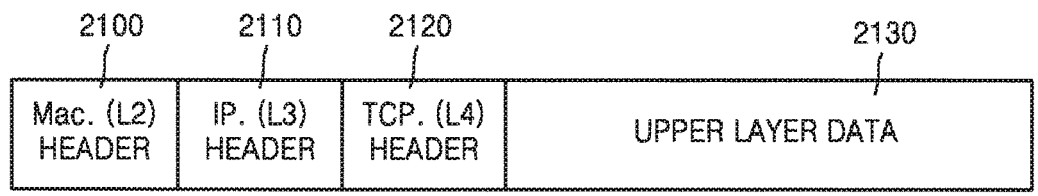
FIG. 21 illustrates a structure of a packet in which necessary information is attached, via L1, L2, and L3 headers from lower layers, to the inside of a payload of an encapsulation packet by using an encapsulation protocol.
Figure 22:
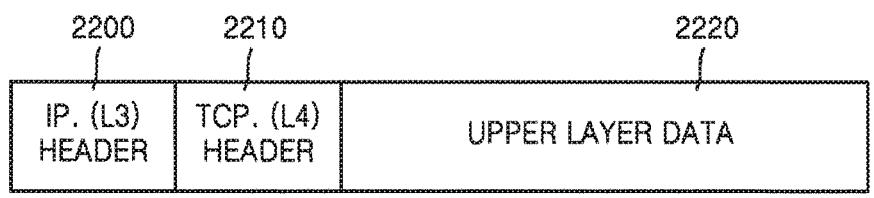
FIG. 22 illustrates a structure of a packet in which necessary client information is attached, via L3 and L4 headers at lower layers, to the inside of a payload of an encapsulation packet by using an encapsulation protocol.

FIGS. 21 and 22 show examples where client information carried in a changed original packet is attached to a payload of the encapsulation packet for forward packet reconstruction. In this case, the forward packet reconstruction illustrated in FIG. 10 is performed by changing a destination address of an original packet including an IP address of a client in a header to a server address, performing encapsulation by attaching the changed original packet to a payload of an encapsulation packet consisting of a header and the payload according to a predetermined encapsulation protocol, and generating a reconstructed packet by adding a new header to the encapsulation packet. Furthermore, the forward packet reconstruction illustrated in FIG. 11 may include performing encapsulation by attaching an original packet including an IP address of a client in a header to a payload of an encapsulation packet consisting of a header and the payload according to a predetermined encapsulation protocol without changing a destination address of the original packet to a server address and generating a reconstructed packet by adding a new header to the encapsulation packet.

Figure 23:
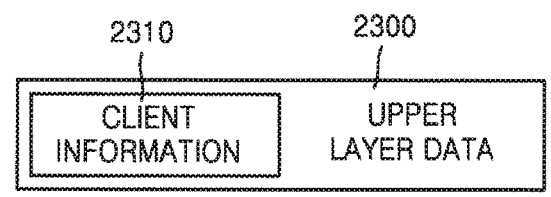
FIG. 23 illustrates a structure of a packet in which necessary information is attached to the inside of data at an upper layer without including a header at a lower layer in a payload of an encapsulation packet by using an encapsulation protocol.

FIG. 23 illustrates another example where client information carried in a changed original packet is attached to a payload of the encapsulation packet for forward packet reconstruction. In this case, the forward packet reconstruction illustrated in FIG. 10 is performed as follows: changing a destination address of an original packet including an IP address of a client in a header to a server address, including information in a header of the changed original packet in a data region of the original packet, performing encapsulation by attaching information 2310 included in the data region of the original packet to a payload 2300 of an encapsulation packet consisting of a header and the is payload 2300 according to a predetermined encapsulation protocol, and generating a reconstructed packet by adding a new header to the encapsulation packet. Furthermore, the forward packet reconstruction illustrated in FIG. 11 may include including information in a header of an original packet including an IP address of a client in the header in a data region of the original packet without changing a destination address of the original packet to a server address, performing encapsulation by attaching the information 2310 included in the data region of the original packet to the payload 2300 of an encapsulation packet consisting of a header and the payload 2300 according to a predetermined encapsulation protocol, and generating a reconstructed packet by adding a new header to the encapsulation packet.

Figure 24:
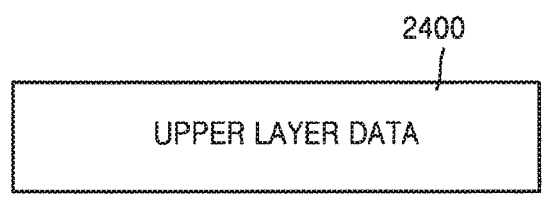
FIG. 24 illustrates an example where a payload of an encapsulation packet using an encapsulation protocol is identical to data from an upper layer, and thus all necessary information is attached to a header of an encapsulation packet.

FIG. 24 illustrates an example where client information carried in a changed original packet is attached to a header of the encapsulation packet for forward packet reconstruction. In this case, the forward packet reconstruction illustrated in FIG. 10 is performed by changing a destination address of an original packet including an IP address of a client in a header to a server address, performing encapsulation by attaching the IP address of the client contained in a header of the changed original packet to a header 2010 of an encapsulation packet consisting of a header and a payload according to a predetermined encapsulation protocol, and generating a reconstructed packet by adding a new header to the encapsulation packet. Furthermore, the forward packet reconstruction illustrated in FIG. 11 may include performing encapsulation by attaching an IP address of a client contained in a header of an original packet to the header 2010 of an encapsulation packet consisting of a header and a payload according to a predetermined encapsulation protocol without changing a destination address of the original packet to a server address and generating a reconstructed packet by adding a new header to the encapsulation packet.

Figure 12:
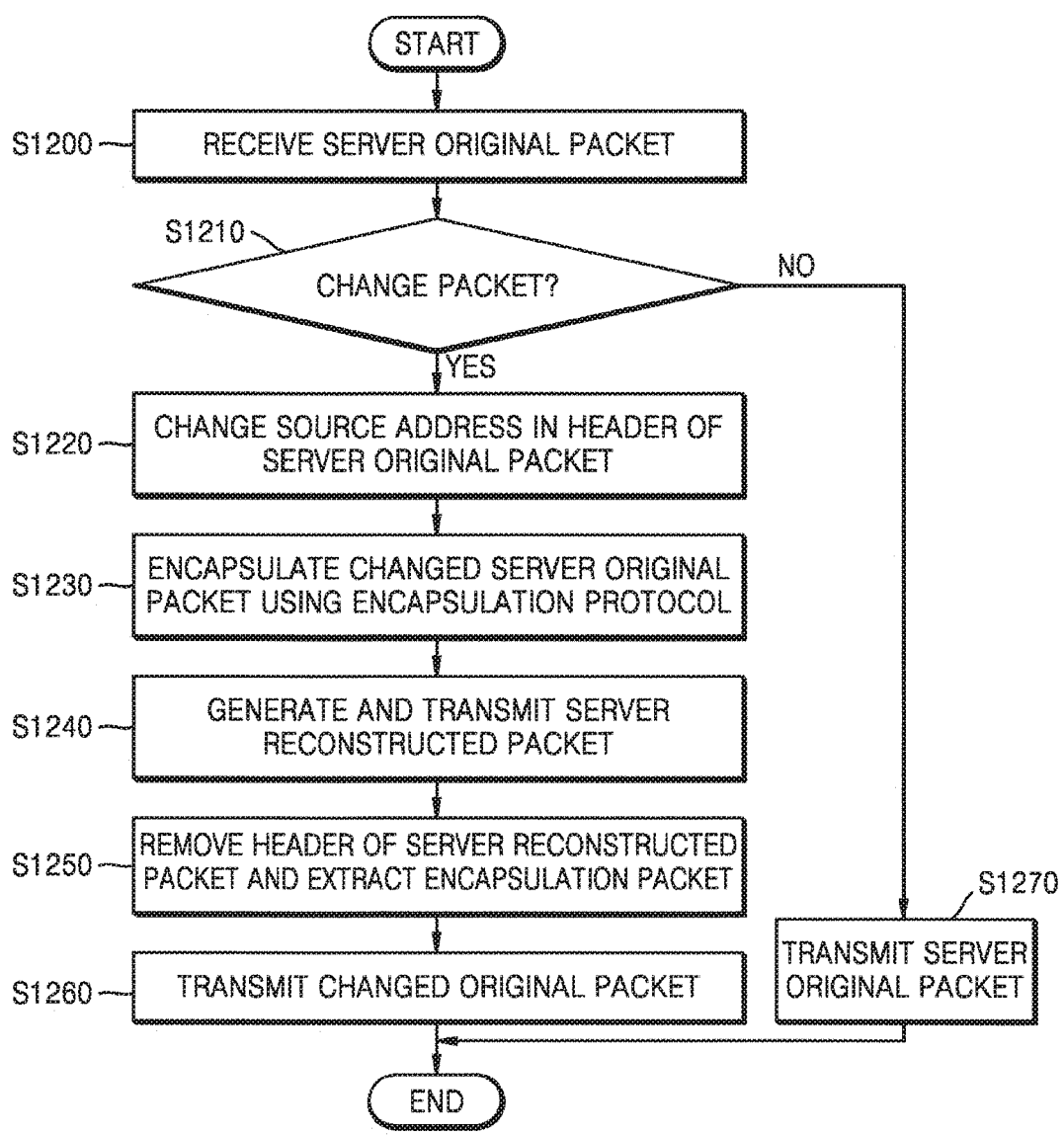
FIG. 12 is a flowchart of a relaying method of transmitting an IP address of a client to a server by using an encapsulation protocol during reverse transmission that is performed after the forward transmission described with reference to FIG. 10 or 11, according to an embodiment of the present invention.

FIG. 12 is a flowchart of a relaying method of transmitting an IP address of a client to a server during reverse transmission that is performed after the forward transmission described with reference to FIG. 10 or 11, according to an embodiment of the present invention.

First, a first relay device receives a server original packet including an IP address of a client in a header via the packet transceiver (S1200), and determines whether the server original packet needs to be changed via a reverse determination unit, and requests, if the server original packet needs to be changed, the change of the server original packet (S1210).

The first relay device changes, if there is a request for the change of the server original packet, a source address in a header of the server original packet to an address of a first proxy via a reverse packet reconstruction unit (S1220), and performs encapsulation by attaching the changed server original packet to the inside of an encapsulation packet consisting of a header and a payload according to a predetermined encapsulation protocol (S1230). The first relay device then generates a server reconstructed packet by adding a new header to the encapsulation packet and transmits the server reconstructed packet to a destination along a preset route via a reverse route controller (S1240).

Thereafter, the second relay device removes a header of the server reconstructed packet and extracts the encapsulation packet via a reverse reconstructed packet dissection unit (S1250) and transmits the server original packet that is inside the extracted encapsulation packet to a destination address of the server original packet (S1260).

If it is determined that the server original packet does not need to be changed (S1210), the second relay device transmits the server original packet without modification thereto along a preset route (S1270).

Figure 13:
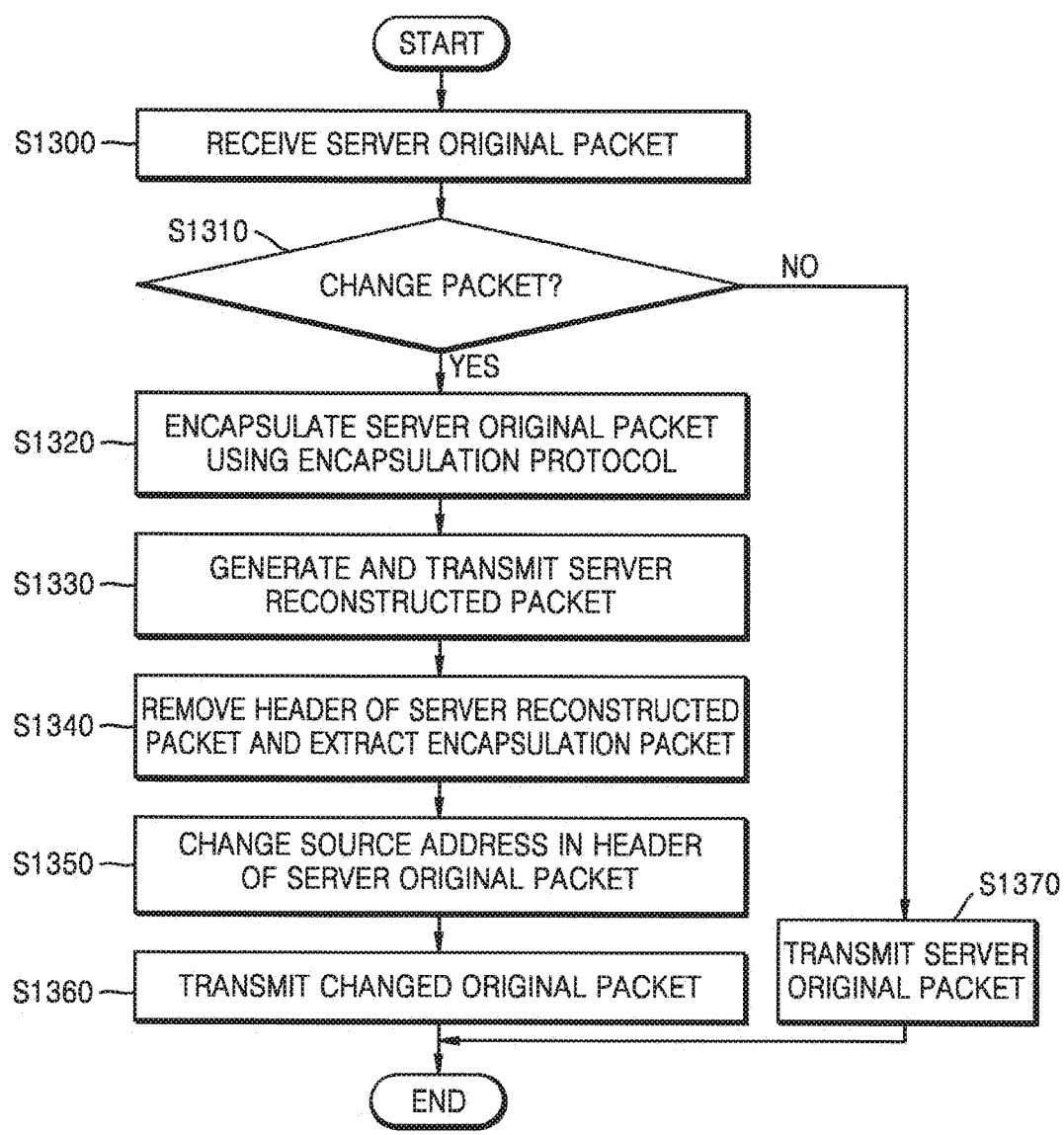
FIG. 13 is a flowchart of a relaying method of transmitting an IP address of a client to a server by using an encapsulation protocol during reverse transmission that is performed after the forward transmission described with reference to FIG. 10 or 11, according to another embodiment of the present invention.

FIG. 13 is a flowchart of a relaying method of transmitting an IP address of a client to a server by using an encapsulation protocol during reverse transmission that is performed after the forward transmission described with reference to FIG. 10 or 11, according to another embodiment of the present invention.

First, the packet transceiver, one of elements of the first relay device receives a server original packet including an IP address of a client in a header (S1300), and determines whether the server original packet needs to be changed via the reverse determination unit and requests, if the server original packet needs to be changed, the change of the server original packet (S1310).

When there is a request for the change of the server original packet, the reverse packet reconstruction unit, one of elements of the first relay device receives the server to original packet including the IP address of the client in the header, and performs encapsulation by attaching the server original packet to the inside of an encapsulation packet consisting of a header and a payload according to a predetermined encapsulation protocol (S1320). The first relay device then generates a server reconstructed packet by adding a new header to the encapsulation packet and transmits is the server reconstructed packet to a destination along a preset route via a reverse route controller (S1330).

Thereafter, the second relay device receives the server reconstructed packet to remove a header of the server reconstructed packet and extract the encapsulation packet via the reverse reconstructed packet dissection unit (S1340), and changes a source address in the header of the server original packet that is inside the extracted encapsulation packet to an address of the first proxy (S1350). The second relay device then transmits the changed server original packet to a destination address of the server original packet (S1360).

If it is determined that the original packet does not need to be changed (S1310), the second relay device transmits the server original packet without modification thereto along a preset route (S1370).

Figure 14:
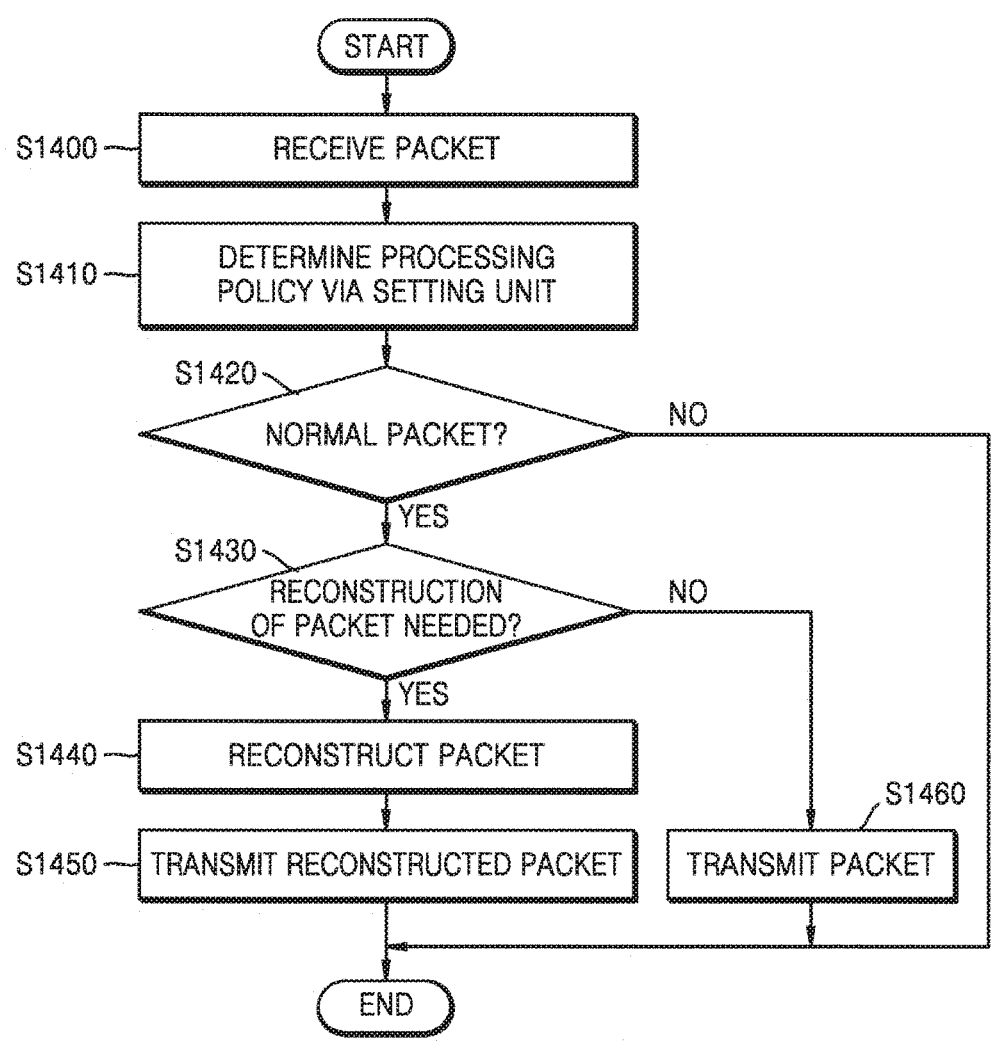
FIG. 14 is a flowchart of a method of processing a packet via a proxy described with reference to FIG. 5.

FIG. 14 is a flowchart of a method of processing a packet via a proxy described with reference to FIG. 5. First, when the first transceiver 510 receives a packet (S1400), the setting unit 570 may determine a packet processing policy (S1410). After determining whether the received packet is a normal packet (S1420), if the received packet is a normal packet, the blocking unit 530 blocks and terminates transmission of the packet.

If the received packet is a normal packet, the determination unit 520 determines whether the packet needs to be reconstructed (S1430). If the received packet needs to be reconstructed, the packet is reconstructed (S1440), and the reconstructed packet is transmitted (S1450). If the received packet does not need to be reconstructed, the packet is transmitted without being reconstructed (S1460).

Figure 15:
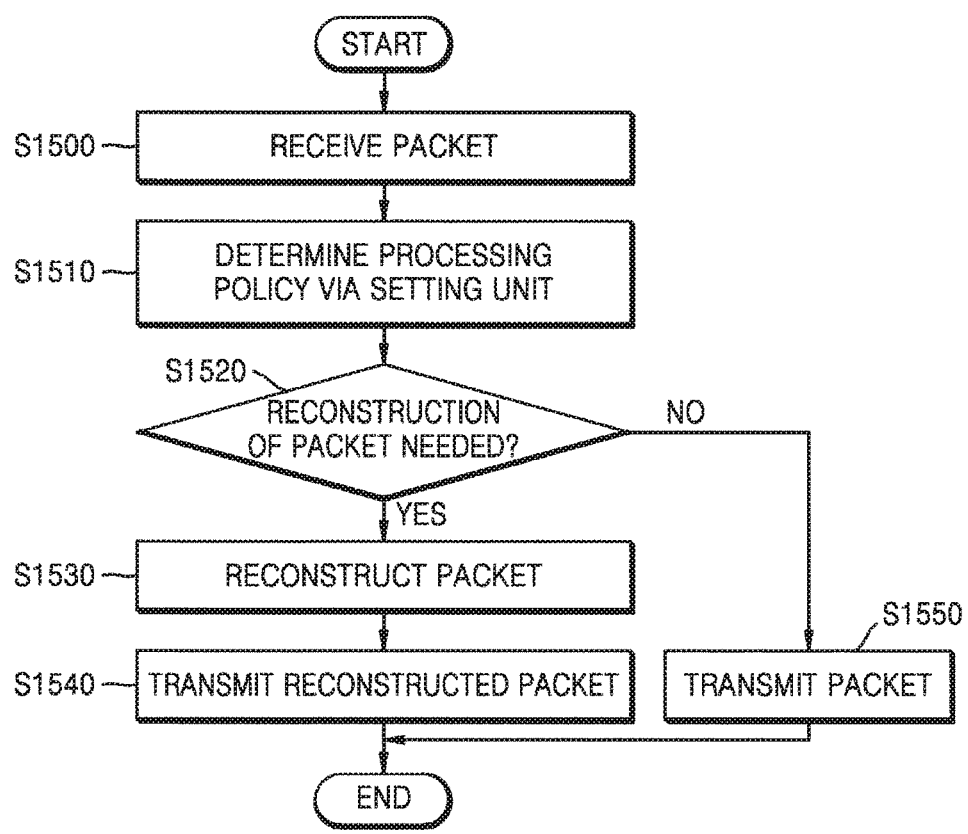
FIG. 15 is a flowchart of a method of processing a packet via a bridge router described with reference to FIG. 6.

FIG. 15 is a flowchart of a method of processing a packet via a bridge router described with reference to FIG. 6. First, when the first transceiver 610 receives a packet (S1500), the setting unit 670 may determine a packet processing policy (S1510). If the received packet needs to be reconstructed, the packet is reconstructed (S1530), and the reconstructed packet is transmitted (S1540). If the received packet does not need to be reconstructed, the packet is transmitted without being reconstructed (S1550).

FIG. 16 is one example of a packet that is exchanged via a relaying system according to the present invention at Layer 3 among seven open system interconnection (OSI) layers.

An example of an implementation of encapsulation and decapsulation processes via communication between a server and a client using a relaying system according to is the present invention will now be described.

Figure 17:
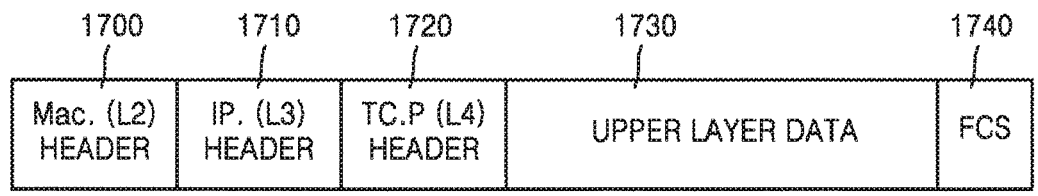
FIG. 17 shows a structure of an actual universal Transmission Control Protocol (TCP) communication packet.

FIG. 17 shows a structure of an actual universal Transmission Control Protocol (TCP) communication packet. The universal TCP communication packet consists of a L2 medium access control (Mac) header 1700, a L3 IP header 1710, a L4 TCP header 1720, upper layer data 1730, frame check sequence (FCS) 1740.

First, referring to FIG. 1, it is assumed that the client 110 transmits TCP information and the server 140 sends a response thereto. Encapsulation and decapsulation in forward transmission are described. Referring to FIG. 1, data transmitted to the proxy 120 by the client 110 is a packet having a structure as shown in FIG. 17. A source address in the L3 IP header 1710 corresponding to Layer 3 among OSI seven layers is an address of the client 110, and a destination address is an IP address of the proxy 120. Similarly, a source port in the L4 TCP header 1720 at Layer 4 is a source port for the client 110, and a destination port is a bound port for the proxy 120.

The proxy 120 uses information of the client 110 which connects to the proxy 120 according to a set value to add the information of the client 110 to a packet to be transmitted by using an encapsulation protocol and reconstructs the packet into a packet having a structure as shown in FIG. 18 or 19, which is referred to as 'encapsulation'.

The client 110 may perform encapsulation using software. In this case, the proxy 120 bypasses encapsulation. Furthermore, instead of the client 110 performing encapsulation, the proxy 120 may perform encapsulation. In this case, the set value used by the proxy 120 is a value indicating whether the client has performed encapsulation by software or the proxy 120 is to perform encapsulation.

Figure 25:
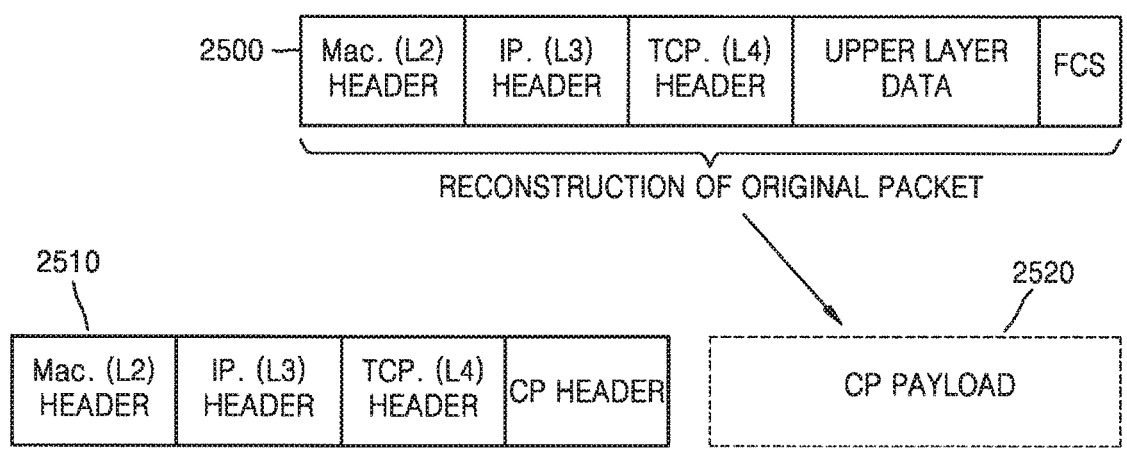
FIG. 25 shows an example where a packet to be transmitted to a destination is generated based on an original packet 2500 transmitted by a client when an encapsulation protocol is used.

FIG. 25 shows an example where a packet to be transmitted to a destination is generated based on an original packet 2500 transmitted by a client when an encapsulation protocol is used.

Referring to FIG. 25, a position where necessary information is attached may be set as shown in FIG. 18 or 19 by using an encapsulation protocol. Reconstruction of an original packet means that, when the original packet 2500 is generated as a packet 2510 to be transmitted to a destination, the original packet 2500 as a packet having a structure as shown in FIGS. 21 through 24 may be carried in a CP payload 2520. In other words, destination information in the original packet 2500 transmitted by the client is changed to a server address but not to a proxy address.

Figure 20:
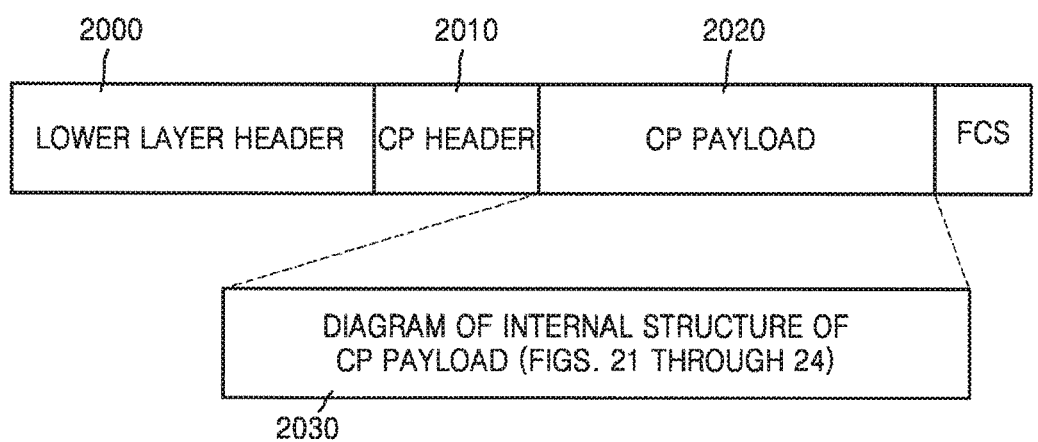
FIG. 20 shows an example where packets shown in FIGS. 21 through 24 are carried in a CP payload.

In detail, client information may be included in a CP header 1830 or 1920 as shown in FIG. 24 or be attached to a CP payload 1840 or 1930 as shown in FIGS. 21 through 24. FIG. 20 is an example where a packet having a structure as shown in FIGS. 21 through 24 is carried in a CP payload. Client information may be included in or attached to the inside of a packet in various other ways. A distinguishing feature is that the proxy 120 attaches client information to the inside of a packet by using an encapsulation protocol. Reconstruction of the original packet 2500 may be performed via either or both of the proxy 120 or bridge router 130.

Furthermore, the encapsulation may be performed by a forward packet reconstruction unit of a relay device according to the present invention. In this case, the relay device may be the proxy 120 or 210 or the bridge router 130 or 230 shown in FIGS. 1 and 2. The relaying device according to the present invention includes the forward packet reconstruction unit 214 and the forward route controller 216.

According to a first embodiment, as shown in FIGS. 18 and 19 illustrating a structure of a packet, the forward packet reconstruction unit 214 changes a destination address of an original packet including an IP address of a client in a header to a server address, performs encapsulation by attaching the changed original packet to the inside of the encapsulation packet (1830 and 1840 of FIG. 18 or 1920 and 1930 of FIG. 19) consisting of a header and a payload according to a predetermined encapsulation protocol, and generates a reconstructed packet by adding a new header to the encapsulation packet.

According to a second embodiment, as shown in FIGS. 18 and 19 illustrating a structure of a packet, the forward packet reconstruction unit 214 performs encapsulation by attaching an original packet including an IP address of a client in a header to the inside of the encapsulation packet (1830 and 1840 of FIG. 18 or 1920 and 1930 of FIG. 19) consisting of a header and a payload according to a predetermined encapsulation protocol without changing a destination address of the original packet, and generates a reconstructed packet by adding a new header to the encapsulation packet.

Furthermore, the forward route controller 216 transmits the reconstructed packet to a destination along a preset route.

In detail, the forward packet reconstruction unit 214 may attach client information carried in the changed original packet to a payload or header of the encapsulation packet.

FIGS. 21 and 22 show examples where the forward packet reconstruction unit 214 attaches client information carried in a changed original packet to a payload of an encapsulation packet. In this case, the forward packet reconstruction unit 214 changes a destination address of an original packet including an IP address of a client in a header to a server address, performs encapsulation by attaching the changed original packet to a payload of an encapsulation packet consisting of a header and a payload according to a predetermined encapsulation protocol, and generates a reconstructed packet by adding a new header to the encapsulation packet. Furthermore, the forward packet reconstruction unit 214 may perform encapsulation by attaching an original packet including an IP address of a client in a header to a payload of an encapsulation packet consisting of a header and the payload according to a predetermined encapsulation protocol without changing a destination address of the original packet to a server address, and generate a reconstructed packet by adding a new header to the encapsulation packet.

FIG. 23 shows another example where the forward packet reconstruction unit 214 attaches client information carried in a changed original packet to a payload of an encapsulation packet. In this case, the forward packet reconstruction unit 214 changes a destination address of an original packet including an IP address of a client in a header to a server address, includes information in a header of the changed original packet in a data region of the original packet, performs encapsulation by attaching information 2310 included in the data region of the original packet to a payload 2300 of an encapsulation packet consisting of a header and the payload 2300 according to a predetermined encapsulation protocol, and generates a reconstructed packet by adding a new header to the encapsulation packet. Furthermore, the forward packet reconstruction unit 214 may includes information in a header of an original packet including an IP address of a client in the header in a data region of the original packet without changing a destination address of the original packet to a server address, perform encapsulation by attaching the information 2310 included in the data region of the original packet to the payload 2300 of an encapsulation packet consisting of a header and the payload 2300 according to a predetermined encapsulation protocol, and generate a reconstructed packet by adding a new header to the encapsulation packet.

FIG. 24 illustrates an example where the forward packet reconstruction unit 214 attaches client information carried in a changed original packet to a header of an encapsulation packet. In this case, the forward packet reconstruction unit 214 changes is a destination address of an original packet including an IP address of a client in a header to a server address, performs encapsulation by attaching the IP address of the client contained in a header of the changed original packet to a header 2010 of an encapsulation packet consisting of the header 2010 and a payload according to a predetermined encapsulation protocol, and generates a reconstructed packet by adding a new header to the encapsulation packet. Furthermore, the forward packet reconstruction unit 214 may perform encapsulation by attaching an IP address of a client contained in a header of an original packet to the header 2010 of an encapsulation packet consisting of the header 2010 and a payload according to a predetermined encapsulation protocol without changing a destination address of the original packet to a server address and generate a reconstructed packet by adding a new header to the encapsulation packet.

Furthermore, when the relay device according to the present invention is the bridge router shown in FIG. 2, the relay device may further include the reverse packet reconstruction unit 234. In this case, the reverse packet reconstruction unit 234 receives a server original packet including an IP address of a client in a header, changes a source address in the header of the server original packet to an address of a first proxy, performs encapsulation by attaching the changed server original packet to the inside of an encapsulation packet consisting of a header and a payload according to a predetermined encapsulation protocol, and generates a server reconstructed packet by adding a new header to the encapsulation packet. Furthermore, the reverse packet reconstruction unit 234 may receive a server original packet including an IP address of a client in a header, perform encapsulation by attaching the server original packet to the inside of an encapsulation packet consisting of a header and a payload according to a predetermined encapsulation protocol without changing a source address in the header of the server original packet to an address of a first proxy, and generate a server reconstructed packet by adding a new header to the encapsulation packet.

In addition, decapsulation during forward transmission is described. The bridge router 130 detects a packet being directed to the server 140 and extracts information of to the client 110 attached to the packet.

When client information is carried in the CP payload 1840 or 1930 by using an encapsulation protocol, i.e., when a premodified header from a lower layer is included in the CP payload 1840 or 1930, a CP header and data attached to a front stage of the CP header are removed, and content in the CP payload 1840 or 1930 is transmitted to the is server 140.

When client information is carried in the CP header 1830 or 1920 by using an encapsulation protocol, the CP header 1830 or 1920 is removed, and information (source address, source port, etc.) contained in a L3 IP header and a L4 TCP header is modified.

In this case, information of the client 110 and information of the proxy 120 that is a destination to where data is actually transmitted are recorded in an address table. Thereafter, a packet is reconstructed into a structure as shown in FIG. 17, which is referred to as decapsulation.

According to the present invention, source information of a packet that reaches the server 140 is information of the client 110, and the server 140 may use the information of the client 110.

Here, the decapsulation is performed in different ways depending on a method of attaching client information during encapsulation. An important feature of the present invention is that information of a packet being routed to the server 140 is extracted to change a source to a client and client information in a changed packet and information of the proxy 120 that is an actual sender are cached.

Next, encapsulation and decapsulation during reverse transmission will now be described. Referring to FIG. 1, the server 140 transmits data to the client 110 as a response. In this case, data received by the server 140 is data requested by the proxy 120. However, a packet is changed by the bridge router 130, and response data generated by the server 140 is transmitted to a source address for a request for data.

The bridge router 130 searches a list of an address table for a destination address of an outbound packet that is an outgoing packet. The address table is an information table including an actual data destination and information of the client 110 recorded during the forward transmission. If a matching address exists, the bridge router 130 reconstructs a packet by using information about the matching address. In this case, for normal network communication, a destination is changed to an actual data destination other than the client 110.

The proxy 120 decapsulates a received packet to have a structure shown in FIG. 3 and relays the decapsulated packet to the client 110. Information of a source of a packet is changed to information of the proxy 120.

The client 110 receives a response packet from the proxy 120.

Embodiments of the present invention can be implemented on a computer-readable recording medium as codes that can be read by a computer (including all devices having information processing capabilities). The computer-readable recording medium is any recording media having stored thereon data that can be read by a computer system. Examples of the computer-readable recording medium include ROM, RAM, CD-ROM, magnetic tapes, floppy disks, and optical data storage devices.

While the present invention has been particularly shown and described with reference to exemplary embodiments thereof, it should be understood that the embodiments described therein should be considered in a descriptive sense only and not for purposes of limitation. It will also be understood by those of ordinary skill in the art that various changes in form and details may be made therein without departing from the spirit and scope of the present invention as defined by the following claims.

INDUSTRIAL APPLICABILITY

The present invention may be applied to a relaying system between a client and a server via a communication network, and in particular, to a relaying system (Proxy and Bridge Router) for transmitting an IP address of a client to a server during wired and wireless communication via relay equipment such as a proxy or gateway.

The invention claimed is:
1. A relaying system for transmitting a client Internet Protocol (IP) to a server by using a predetermined encapsulation protocol, the relaying system comprising:
a first proxy configured to receive an original packet including the client IP in a header of the original packet and generate a reconstructed packet by adding a new header to the original packet; and
a bridge router configured to receive the reconstructed packet, extract the original packet from the reconstructed packet, and transmit information about the client IP to the server,
wherein the bridge router and the server are on the same network,
wherein the original packet has a source address as the client IP, a destination address as a first proxy IP, not a server IP,
the reconstructed packet has a source address as the first proxy IP, a destination address as the server IP and is transmitted to the bridge router along a preset route,
and the original packet received by the server from the bridge router has a source address as the client IP, a destination address as the server IP,
wherein the first proxy or the bridge router recognizes in advance that the destination address of the original packet is the server IP,
wherein the destination address of the original packet is changed to the server IP by the first proxy or the bridge router, the source address of the original packet is not changed by the first proxy or the bridge router,
wherein the client recognizes the first proxy, not the server, as a destination, and the server recognizes the client, not the first proxy, as a source,
wherein the bridge router receives a server original packet including the client IP in a header of the server original packet from the server and generates a server reconstructed packet by adding a new header to the server original packet, and
the first proxy receives the server reconstructed packet, extracts the server original packet from the server reconstructed packet, and transmits the extracted server original packet to the client,
wherein the server original packet has a source address as the server IP, a destination address as the client IP, the server reconstructed packet has a source address as the server IP, a destination address as the first proxy IP, and the server original packet received by the client from the first proxy has a source address as the first proxy IP, a destination address as the client IP,
wherein the source address of the server original packet is changed to the first proxy IP by the first proxy or the bridge router, the destination address of the server original packet is not changed by the first proxy or the bridge router,
wherein the client recognizes the source of the server original packet as the first proxy, not the server, and the server recognizes the destination of the server original packet as the client, not the first proxy,
wherein as the original packet is transmitted from the client to the server, the source address of the original packet is not changed, but the destination address of the original packet is changed from the first proxy IP to the server IP, and as the server original packet is transmitted from the server to the client, the source address of the server original packet is changed from the server IP to the first proxy IP, but the destination address of the server original packet is not changed,
wherein the server IP is not known to the client, but the client IP is recognized by the server;
wherein when the source address of the server original packet is changed to the first proxy IP by the bridge router, the bridge router further comprises: a reverse packet reconstruction unit configured to receive a server original packet including the client IP in a header, change a source address in the header of the server original packet to an address of the first proxy, and generate a server reconstructed packet by adding a new header to the changed server original packet; and
a reverse route controller configured to transmit the server reconstructed packet to a destination of the server reconstructed packet along a preset route, and
wherein when the source address of the server original packet is changed to the first proxy IP by the bridge router, the first proxy further comprises a reverse reconstructed packet dissection unit configured to remove a header of the server reconstructed packet, extract the changed server original packet from the server reconstructed packet, and transmit the extracted server original packet to a destination address of the server original packet,
wherein when the source address of the server original packet is changed to the first proxy IP by the first proxy, the bridge router further comprises: a reverse packet reconstruction unit configured to receive a server original packet including the client IP in a header, and generate a server reconstructed packet by adding a new header to the server original packet; and a reverse route controller configured to transmit the server reconstructed packet to a destination of the server reconstructed packet along a preset route, and
wherein when the source address of the server original packet is changed to the first proxy IP by the first proxy, the first proxy further comprises a reverse reconstructed packet dissection unit configured to remove a header of the server reconstructed packet, extract the server original packet from the server reconstructed packet, change a source address in the header of the extracted server original packet to an address of the first proxy, and transmit the changed server original packet to a destination address of the server original packet.

2. The relaying system of claim 1, wherein the first proxy comprises:
a forward packet reconstruction unit configured to change a destination address of the original packet to a server address when the original packet is received, and generate the reconstructed packet by adding a new header to the changed original packet; and
a forward route controller configured to transmit the reconstructed packet to a destination of the reconstructed packet along a preset route, and
wherein the bridge router comprises a reconstructed packet dissection unit configured to remove a header of the reconstructed packet, extract the changed original packet from the reconstructed packet, and transmit the extracted original packet to the destination of the changed original packet.

3. The relaying system of claim 1, wherein the first proxy comprises:
a forward packet reconstruction unit configured to generate the reconstructed packet by adding a new header to the original packet; and
a forward route controller configured to transmit the reconstructed packet to a destination of the reconstructed packet along a preset route, and wherein the bridge router comprises a reconstructed packet dissection unit configured to remove a header of the reconstructed packet, extract the original packet from the reconstructed packet, change a destination address of the extracted original packet header to the server IP, and transmit the changed original packet to a destination address of the changed original packet.

4. A method of transmitting a client Internet Protocol (IP) to a server via a relaying system by using a predetermined encapsulation protocol, the method comprising:
  receiving, via a first relay device, an original packet including the client IP in the header;
  generating, via the first relay device, a reconstructed packet by adding a new header to the original packet;
  transmitting, via the first relay device, the reconstructed packet to a destination of the reconstructed packet along a preset route; and
  receiving, via a second relay device, the reconstructed packet, removing a header of the reconstructed packet, and transmitting information about the client IP to the server,
  wherein the second relay device and the server are on the same network,
  wherein the original packet has a source address as the client IP, a destination address as a first relay device IP, not a server IP,
  the reconstructed packet has a source address as the first relay device IP, a destination address as the server IP and is transmitted to the second relay device along a preset route, and
  the original packet received by the server has a source address as the client IP, a destination address as the server IP,
  wherein the first relay device or the second relay device recognizes in advance that the destination address of the original packet is the server IP,
  wherein the destination address of the original packet is changed to the server IP by the first relay device or the second relay device, and the source address of the original packet is not changed by the first relay device or the second relay device,
  wherein the client recognizes the first relay device, not the server, as a destination, and the server recognizes the client, not the first relay device, as a source, and
  wherein the method further comprising:
  receiving, via the second relay device, a server original packet including the client IP in the header from the server;
  generating, via the second relay device, a server reconstructed packet by adding a new header to the server original packet;
  transmitting, via the second relay device, the server reconstructed packet to a destination of the server reconstructed packet; and
  receiving, via the first relay device, the server reconstructed packet, removing a header of the server reconstructed packet, and transmitting the server reconstructed packet whose header is removed to the client,
  wherein the server original packet has a source address as the server IP, a destination address as the client IP, and the server reconstructed packet has a source address as the server IP, a destination address as the first relay device IP,
  wherein the source address of the server original packet is changed to the first relay device IP by the first relay device or the second relay device, the destination address of the server original packet is not changed by the first relay device or the second relay device, and the server original packet received by the client from the first relay device has a source address as the first relay device IP, a destination address as the client IP,
  wherein the client recognizes the source of the server original packet as the first relay device, not the server, and the server recognizes the destination of the server original packet as the client, not the first relay device,
  wherein as the original packet is transmitted from the client to the server, the source address is not changed, but the destination address is changed from the first relay device IP to the server IP, and as the server original packet is transmitted from the server to the client, the source address of the server original packet is changed from the server IP to the first relay device IP, but the destination address of the server original packet is not changed,
  wherein the server IP is not known to the client, but the client IP is recognized by the server;
  wherein when the source address of the server original packet is changed to the first relay device IP by the second relay device,
  the receiving, via the second relay device, a server original packet includes receiving, via the second relay device, a server original packet including the client IP as a destination address in a header and changing a source address in the header of the server original packet to the first relay device IP;
  the generating, via the second relay device, a server reconstructed packet includes generating, via the second relay device, a server reconstructed packet by adding a new header whose destination address is IP of the first relay device to the changed server original packet;
  the transmitting, via the second relay device, the server reconstructed packet includes transmitting, via the second relay device, the server reconstructed packet to a destination along a preset route; and
  the receiving, via the first relay device, the server reconstructed packet includes extracting, via the first relay device, the changed server original packet from the server reconstructed packet by removing a header of the server reconstructed packet and transmitting the extracted changed original packet to a destination address of the changed server original packet, and
  wherein when the source address of the server original packet is changed to the first relay device IP by the first relay device,
  the receiving, via the second relay device, a server original packet includes receiving, via the second relay device, a server original packet including the client IP in the header;
  the generating, via the second relay device, a server reconstructed packet includes generating, via the second relay device, a server reconstructed packet by adding a new header whose destination address is IP of the first relay device to the server original packet;
  the transmitting, via the second relay device, the server reconstructed packet includes transmitting, via the second relay device, the server reconstructed packet to a destination of the server reconstructed packet along a preset route; and
  the receiving, via the first relay device, the server reconstructed packet includes extracting, via the first relay device, the server original packet from the reconstructed packet by removing a header of the server reconstructed packet, changing a source address in the header of the server original packet to an IP of the first relay device, and transmitting the changed server original packet to a destination address of the changed server original packet.

5. The method of claim 4, the generating of a reconstructed packet comprising:

changing, via the first relay device, the destination address of the original packet to the server IP; and generating, via the first relay device, a reconstructed packet by adding a new header to the changed original packet.

6. The method of claim 4, the transmitting of information about the IP of the client comprising:

extracting, via the second relay device, the original packet from the reconstructed packet by removing a header of the reconstructed packet;

changing, via the second relay device, a destination address of the extracted original packet to the server IP; and transmitting, via the second relay device, the changed original packet to a destination of the changed original packet.

7. The method of claim 4, the generating of a reconstructed packet comprising:

changing, via the first relay device, the destination address of the original packet to the server IP; and generating, via the first relay device, a reconstructed packet by adding a new header to the changed original packet, wherein the second relay device removes a header of the reconstructed packet, extracts the changed original packet, and transmits the changed original packet to the server.

* * * * *